United States Patent
Garber

(10) Patent No.: US 11,463,533 B1
(45) Date of Patent: Oct. 4, 2022

(54) ACTION-BASED CONTENT FILTERING

(71) Applicant: Amazon Technologies, Inc., Reno, NV (US)

(72) Inventor: Brian Ashley Garber, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 653 days.

(21) Appl. No.: 15/078,823

(22) Filed: Mar. 23, 2016

(51) Int. Cl.
*H04L 67/50* (2022.01)
*H04L 51/02* (2022.01)
*G06F 3/01* (2006.01)

(52) U.S. Cl.
CPC .............. *H04L 67/22* (2013.01); *G06F 3/013* (2013.01); *H04L 51/02* (2013.01)

(58) Field of Classification Search
CPC ......... H04L 67/22; H04L 51/02; H04L 51/00; H04L 12/1813; H04L 65/403; G06F 3/013; G02B 27/0093
See application file for complete search history.

(56) References Cited

U.S. PATENT DOCUMENTS

| | | | | |
|---|---|---|---|---|
| 6,507,866 B1* | 1/2003 | Barchi | ................ | G06Q 10/107 709/207 |
| 8,700,714 B1* | 4/2014 | Pan | .................... | H04N 21/2668 709/206 |
| 2010/0205541 A1* | 8/2010 | Rapaport | ............... | G06Q 10/10 715/753 |
| 2012/0023113 A1* | 1/2012 | Ferren | ................. | G06F 16/9535 707/751 |
| 2014/0067969 A1* | 3/2014 | Archibong | .............. | H04L 67/22 709/206 |
| 2014/0201844 A1* | 7/2014 | Buck | ..................... | G06F 21/554 726/26 |
| 2014/0337477 A1* | 11/2014 | Fisher | ................... | H04L 65/601 709/219 |
| 2014/0362225 A1* | 12/2014 | Ramalingamoorthy | ..................... | G06K 9/00771 348/159 |
| 2015/0234457 A1* | 8/2015 | Kempinski | ............. | G06F 3/013 345/156 |
| 2016/0109941 A1* | 4/2016 | Govindarajeswaran | ..................... | G06F 3/012 345/156 |
| 2017/0163594 A1* | 6/2017 | Anderson | ............... | H04L 51/34 |

* cited by examiner

*Primary Examiner* — Lesa M Kennedy
(74) *Attorney, Agent, or Firm* — Hogan Lovells US LLP

(57) ABSTRACT

Actions determined with respect to primary content displayed on a computing device can be used to select and/or filter supplemental content to be displayed on that computing device, enabling near real time filtering decisions to be made that are device- or user-specific. Actions can relate to gaze positions, voice discussions, object selection, and the like. If an object of interest can be determined based on the actions, supplemental content such as chat messages can be selected that relate to the object. For example, if it is determined that the gaze position for a display of primary content corresponds to coordinates where a representation of a pair of shoes is displayed, messages relating to those shoes may be selected for display where messages for other topics might not be selected in order to manage the number of messages displayed on the computing device.

20 Claims, 14 Drawing Sheets

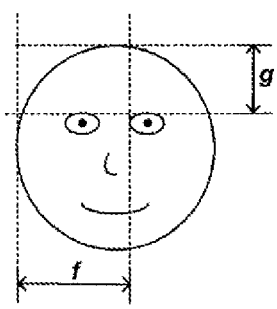
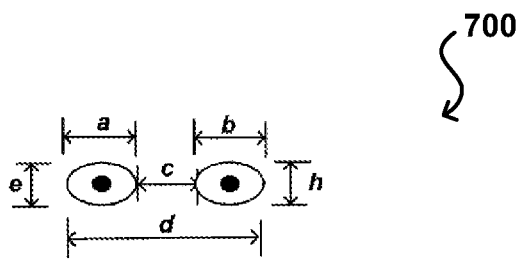
FIG. 7A    FIG. 7B
         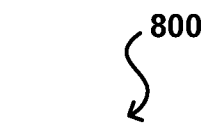
FIG. 8A    FIG. 8B    FIG. 8C
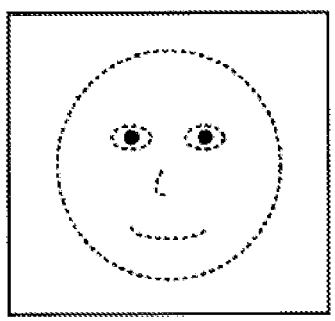 − 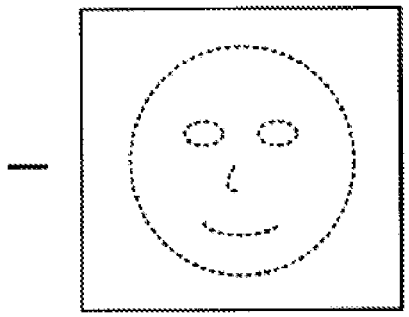 = 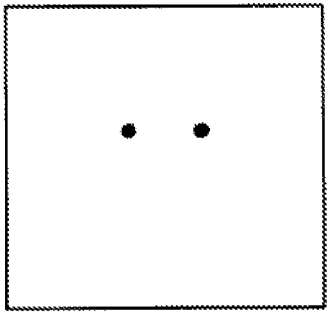
FIG. 9A    FIG. 9B    FIG. 9C

ACTION-BASED CONTENT FILTERING

BACKGROUND

As people are increasingly obtaining various types of content electronically, the types of content that can be delivered are increasing as well. For example, users viewing video content can send or post messages via social media that can then be incorporated into, or associated with, the video content. One problem with such an approach, however, is that the volume of messages received can be too great to enable all the messages to be provided with the content, or to enable viewers to be able to read all the messages received. In order to reduce the number of messages conveyed to users via conventional approaches, the messages could be selected at random, which would cause content that may not be particularly relevant to be conveyed, or could be reviewed and selected by one or more human operators based on content, which would enable only a small number of messages to be conveyed and would come with significant overhead.

BRIEF DESCRIPTION OF THE DRAWINGS

Various embodiments in accordance with the present disclosure will be described with reference to the drawings, in which:

FIGS. 7A and 7B illustrate analysis of facial features of a user in accordance with various embodiments.

FIGS. 8A, 8B, and 8C illustrate an example of capturing eye movement of a user as input in accordance with various embodiments.

FIGS. 9A, 9B, and 9C illustrate an approach to determining retina location from a pair of images that can be used in accordance with various embodiments.

DETAILED DESCRIPTION

Systems and methods in accordance with various embodiments of the present disclosure may overcome one or more of the aforementioned and other deficiencies experienced in conventional approaches to determining content to display via a computing device. In particular, various approaches determine actions performed with respect to a presentation of primary content on a computing device in order to select and/or filter secondary content to be presented on the computing device.

In some embodiments, one or more sensors or components on a computing device can be used to detect specific actions performed with respect to the device. This can include, for example, image sensors capturing image data or microphones capturing audio data that can be analyzed to determine objects, in the primary content being presented, that might be of interest to a user based on the user's actions. Various other actions, such as manual selection or zoom input, can be utilized as well. In situations where the amount of supplemental content is more than can practically be displayed on a computing device, such as for chat messages or other crowd-sourced content relating to the primary content, it can be desirable to filter or select a subset of the supplemental content for display. If it can be determined based upon a gaze position that the user is viewing a particular object represented in the primary content, such as a live video stream displayed on the computing device, then messages or other supplemental content relating to that object can be selected based on the topic of those messages relating to the object of interest. This allows for supplemental content to be provided that corresponds to actions determined for the computing device, whether the supplemental content is specific to the device or to the object of interest. Various other filters can be used as well to control the amount of messages or supplemental content received, in case the volume of messages relating to a topic of interest falls outside a desired volume of messages over time.

Various other functions and advantages are described and suggested below in accordance with the various embodiments.

Figure 1A:
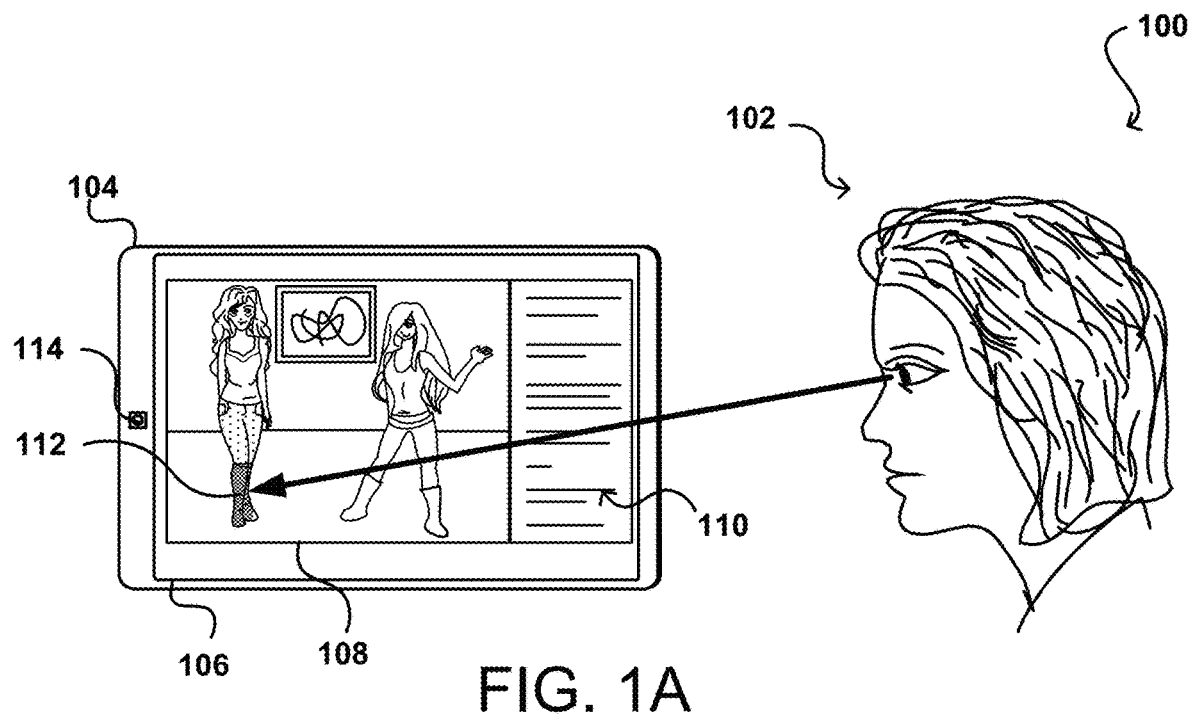
FIGS. 1A and 1B illustrate an example wherein supplemental content displayed on a device is filtered based at least in part upon a determined gaze position of a user that can be utilized in accordance with various embodiments.

FIG. 1A illustrates an example environment 100 in which a user 102 is viewing content that is displayed on a display screen 106 of a computing device 104. Although a portable computing device (e.g., a smart phone, an electronic book reader, or tablet computer) is shown, it should be understood that various other types of electronic device that are capable of displaying content and exchanging electronic messages can be used in accordance with various embodiments discussed herein. These devices can include, for example, notebook computers, personal data assistants, video gaming consoles, streaming media devices, portable media players, and wearable computers (e.g., smart watches, smart glasses, etc.) among others. In this example, the content includes primary content corresponding to a live video stream portion 108, although other types of content such as gaming content, broadcast content, or animation can be utilized as well within the scope of the various embodiments. A video stream, or other data stream, refers to a sequence of digitally encoded coherent signals, such as may include a plurality of data packets of data, used to transmit or receive information. The content also includes supplemental content corresponding to a chat stream portion 108, although various other types of content could be presented as well within the scope of the various embodiments, as may include other types of messaging, comments, or voice input. The chat stream portion 110 in this example is related to the video stream portion 106. Users viewing the video using at least one different client device in near real time can enter messages into an appropriate application, website, or other such interface or mechanism, the data can be transmitted as appropriate, and the messages can appear in the chat session and displayed via the chat stream portion 110. As mentioned, however, for sessions that might have thousands or even millions of participants, it will be impractical at best to display messages from all participants providing messages on the session.

One approach to reducing the number of messages would be to randomly select messages or select a specific subset of messages based on the time and/or order in which they are received. Another approach would be to use one or more static filters to attempt to remove specific messages or types of messages, such as messages that include curse words, repeat what other messages included, or include certain whitelisted or blacklisted terms, among others. Some filters might also only allow a maximum number of messages from each user over a determined period of time. Another approach would involve one or more people reading the messages as they are received and determining which messages to cause to be displayed to the various viewers. Various other such approaches can be utilized as well.

One potential downside to these approaches, however, is that the selection of messages to display would be done using the same criteria for all viewers. While television broadcasters and other such entities are limited to providing the same content for a group of users, providers of content such as chat streams and social media feeds can provide different data to different users, or enable the applications on specific devices to select different content for display, among other such options. Accordingly, content provided for presentation on different devices can be selected or determined based at least in part upon actions or interactions with the device, the content, or another such aspect related to the presentation of content.

In the example of FIG. 1A, the user 102 is looking at a pair of boots that is being worn by one of the characters represented in the video stream content 108. Because the example device 104 has a front facing camera 114 on a same side of the device 104 as the display screen 106, a user viewing content displayed on the display screen will likely be within a field of view of the camera 114. Image data (i.e., still image or video data) captured using the camera can be analyzed to locate a representation of the user, as well as to determine the relative positions of the user's pupils or other eye features. As discussed later herein, the relative positions can be used to determine a gaze direction of the user and/or a gaze position with respect to the display screen. If a gaze position can be determined to align with a display location for the boots on the display screen, then a determination can be made that the user is looking at the boots. If the user is determined to be looking at the boots for more than a threshold amount of time, such as may correspond to an amount of time an average user would normally spend looking at random objects displayed in video content, then it can be inferred that the user is at least somewhat interested in the boots.

Figure 1B:
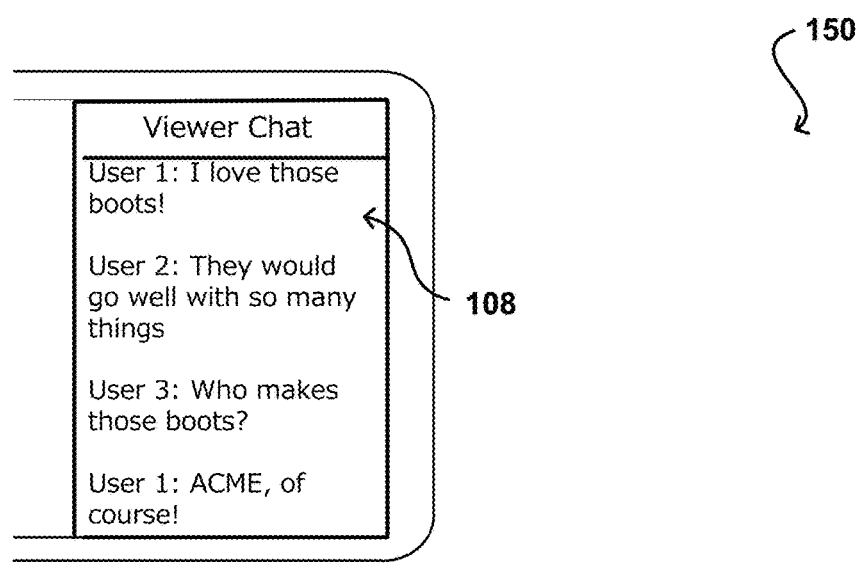

Information about an interest or action of the user can be used to select and/or filter the messages to be displayed on the computing device 104 in the chat stream content 110. FIG. 1B illustrates and example set of messages 108 that could be displayed on a relevant portion 150 of the device in accordance with various embodiments. As illustrated, the chat messages displayed relate to the boots represented in the video content. The type(s) of messages to be displayed can also update automatically as different actions occur or are detected, such as when the gaze position is determined to correspond to a different item. For example, if the gaze position is determined to now correspond to a display position for a painting on the wall, the chat messages selected for display to the user can include messages that relate to the painting. The types of messages presented thus can be updated based at least in part upon a current or most recent action detected by the computing device and/or otherwise determined.

Figure 2A:
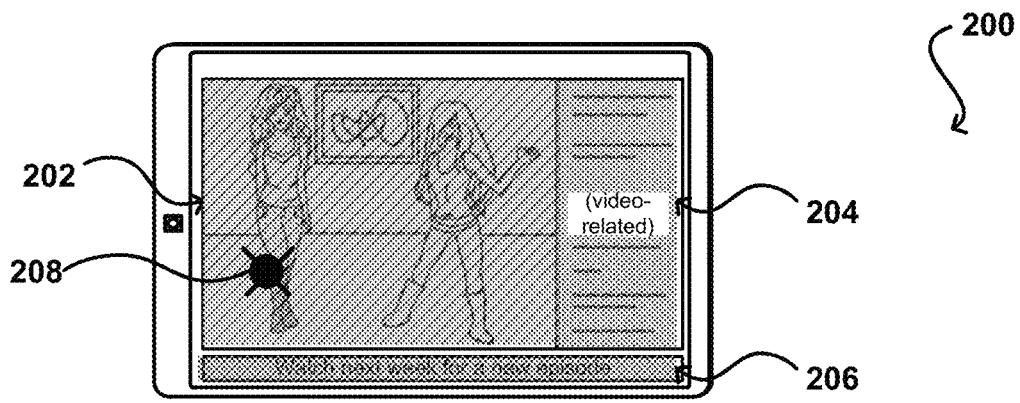
FIGS. 2A, 2B, and 2C illustrate example objects or regions of interest that can be determined for a current gaze position in accordance with various embodiments.
Figure 2B:
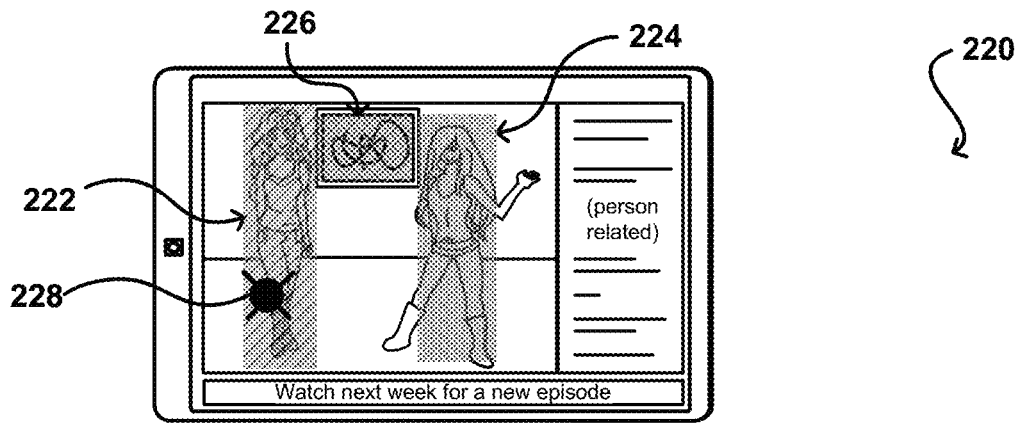
Figure 2C:
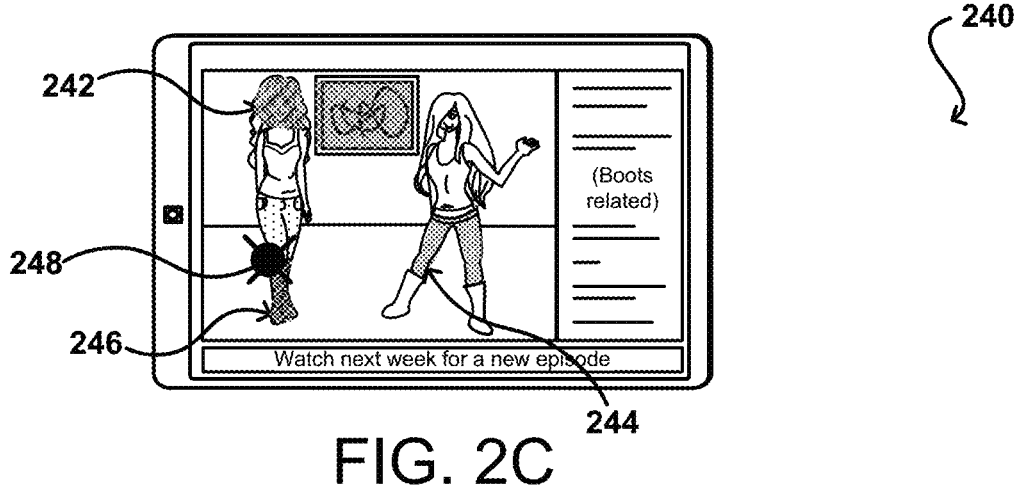

The portion of the content corresponding to a specific location, such as may be displayed by a subset of pixels on a display screen, can be determined or defined in a number of different ways, which can depend at least in part upon the accuracy of the gaze detection process and the information available for the displayed content, among other such factors. For example, FIG. 2A illustrates and example content presentation 200 wherein there are three distinct content presentation regions presented on the display screen. A first region 202 corresponds to live video content, a second region 204 corresponds to a chat session, and a third region 206 corresponds to other content, which may or may not be related to the video and/or chat content. In some embodiments, the third region could also be determined to be any area of the display screen outside the first and second regions where the video and chat content are displayed.

In such an example, the content can be filtered based upon the region that corresponds to a current or most recently determined gaze position 208. For example, if the gaze position corresponds to the video content for an extended period of time, then a determination can be made that the user is more interested in the video content than the chat feed. In some embodiments, this can be used to reduce the number or rate of messages displayed on that device in order to conserve resources. In other embodiments, this can be an indication that the user is not interested in the current chat topic displayed, particularly if the gaze position was determined to correspond to the chat session region during a different discussion topic. Thus, if the chat content in such a situation relates to a particular topic, a determination can be made to switch to a different topic, such as one that was previously determined to be of interest to the user, or to switch to a more general topic, among other such options. A similar change can be made if the gaze position 208 is determined to correspond to the third region displayed unrelated content, for example, which indicates that the user may not be as interested in the current video or chat content. If the gaze direction is only determined to linger in the first or second regions during certain types of content display, then the topics selected for display in the chat session can be selected to relate to primarily to those topics, among other such possibilities.

In another example approach, regions of the video content display might be assigned to specific objects of interest as well. In these situations, a provider of the video content may have identified objects, such as characters, products, and significant items as corresponding to regions of the content, as may be contained within bounding boxes determined using a pair of pixel coordinates or other such information. It should be understood, however, that object recognition and other such processes could be used to make such determinations on the computing device as well within the scope of the various embodiments. In this example, a first region 222 is associated with a first character represented in the video content, and a second region 224 is associated with a second character. A third region 226 is associated with an object represented in the content, in this case a painting on the wall. If the gaze position 228 is determined to correspond to the first character region 222 as in this example, the chat messages selected for display can relate to the character or some aspect of the character. Example topics can include, for example, the actor playing that character, other things the character has done, clothing worn by the character, places associated with the character, and the like. If the gaze position switches to be associated with one of the other regions 224, 226 then the chat message topics can update accordingly. If the gaze position is determined to be outside those regions, then a more general topic or set of known topics of interest can be selected, among other such options.

In some embodiments the object of interest determination can be much more precise. In this example, the objects of interest can be defined by the approximate boundary of the objects, and can relate to very specific items represented in the video content as may be limited only by the resolution of the display and/or the detection process, for example. In this example, the first region 242 corresponds to the face or head of one of the characters. This may be indicative of the person being interested in the character as opposed to something the character is wearing or holding. It might be the case, however, that the gaze position 248 is towards the user's foot, which can correspond to a region 246 associated with a pair of boots the character is wearing. Accordingly, even though the gaze position is at a region corresponding to the character, that particular region may be associated with an item worn by the character. Similarly, if the gaze position switches to the other represented character but is determined to correspond to a region associated with that character's pants, the chat topic can switch to comments associated with the pants, as may relate to the style, brand, cut, etc. The topics can relate to other identified objects or items as well, such as a character's hair, a watch, an animal, or another such identifiable object contained within the scene displayed on the device.

Figure 3:
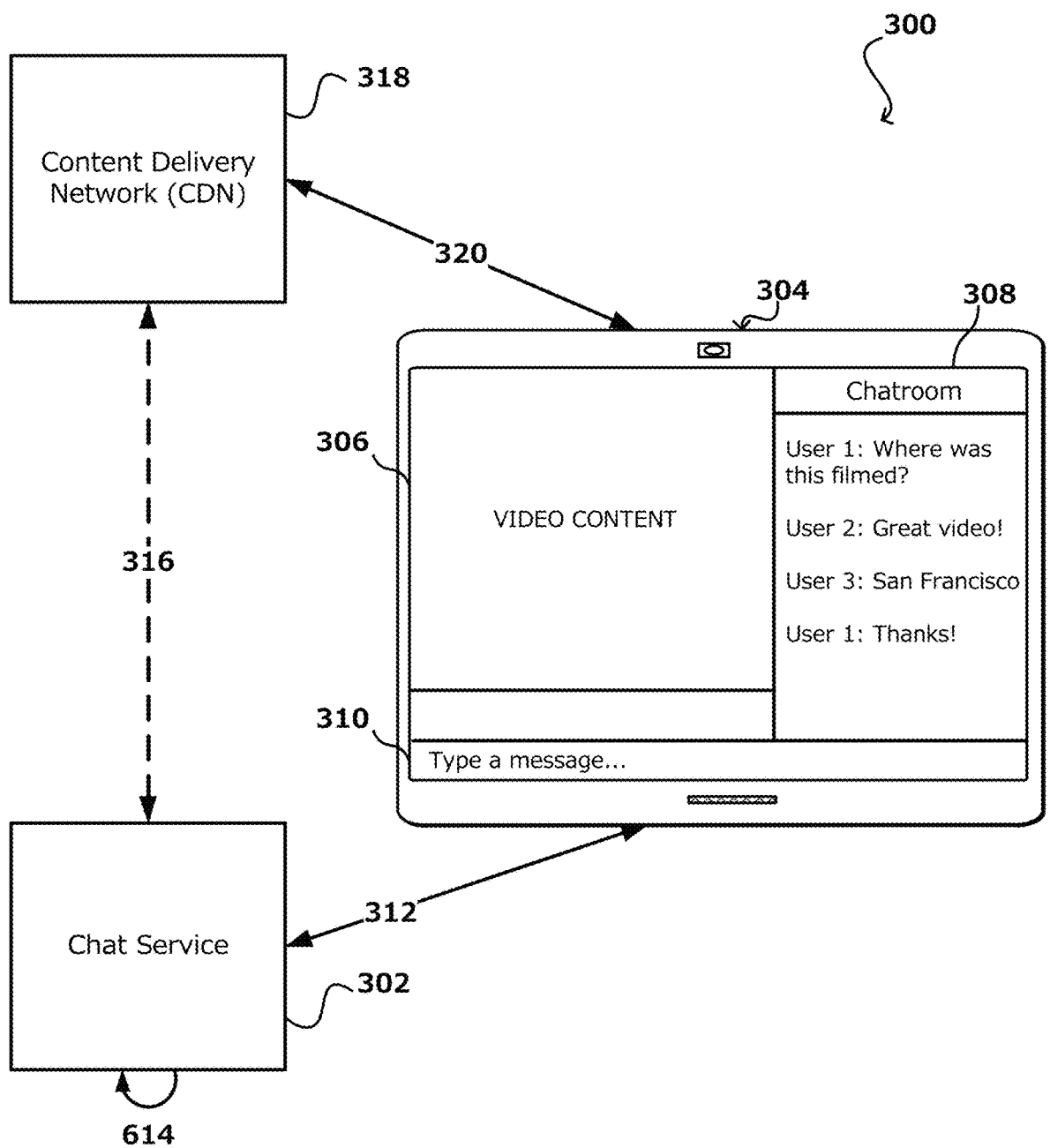
FIG. 3 illustrates an example environment for distributing messages using a content delivery network that can be utilized in accordance with various embodiments.

As mentioned, there can be various types of content displayed on a computing device for which aspects of the various embodiments can be utilized. FIG. 3 illustrates an example of one such environment 300 in which a chat service 302 can be accessed using a client device 304. The chat service 302 can include any group messaging service including synchronous messaging services, asynchronous messaging services, or any other messaging service. Various other types of communication and social media services can be utilized as well in various embodiments. In some embodiments, a chat service 302 can provide various chat rooms in which users exchange messages. A user may request to join a particular chat room and/or may be assigned to a chat room at login. In some embodiments, the chat service 302 can provide chat rooms associated with content from a content service. For example, a content service can include a video distribution service, images service, or other content service that distributes content to user devices. The content service and chat service can each be associated with a client (i.e., application or interface) that may execute on a client device 304. For example, as shown in FIG. 3, a video client 306 is displaying video content on the client device. Each content item (e.g., image, video, music, or other content) can be associated with a different chat room. In this example, the video content provided by video distribution service 306 is associated with a specific chat room 308.

In this example, three users are shown exchanging messages in the chat room 308. A user can type a message 310 and submit 312 the message to the chat service 302. As discussed, each message may relate to a specific topic. For example, a question, such as that posed by User 1 ("Where was this filmed?") requests additional information about the associated content displayed in video distribution service 106. Similarly, an answer to the question, as provided by User 3 ("San Francisco") may relate that that particular topic. Other messages, such as that provided by User 2 ("Great video!") may also relate to some aspect of the video content, which as discussed can be considered as the same or a different topic from the location for the video. The chat service 302 can process 314 each message received. For example, the chat service 302 can determine a topic for the message and/or various message attributes associated with the message such as type of message (e.g., question, answer, etc.), value, related messages, or other such attribute. Messages may be grouped based on their topic and/or based on their attributes. The chat service 302 can send the messages for display on the client device 304, or in some embodiments can send 316 the messages to a content delivery network (CDN) 318 to be distributed 320 to various client devices, such as those logged onto a chat session. The CDN 318 in such examples can send a message data stream for each group of messages, enabling a particular group of messages to be sent to a particular client device. Such techniques are discussed further below.

Figure 4:
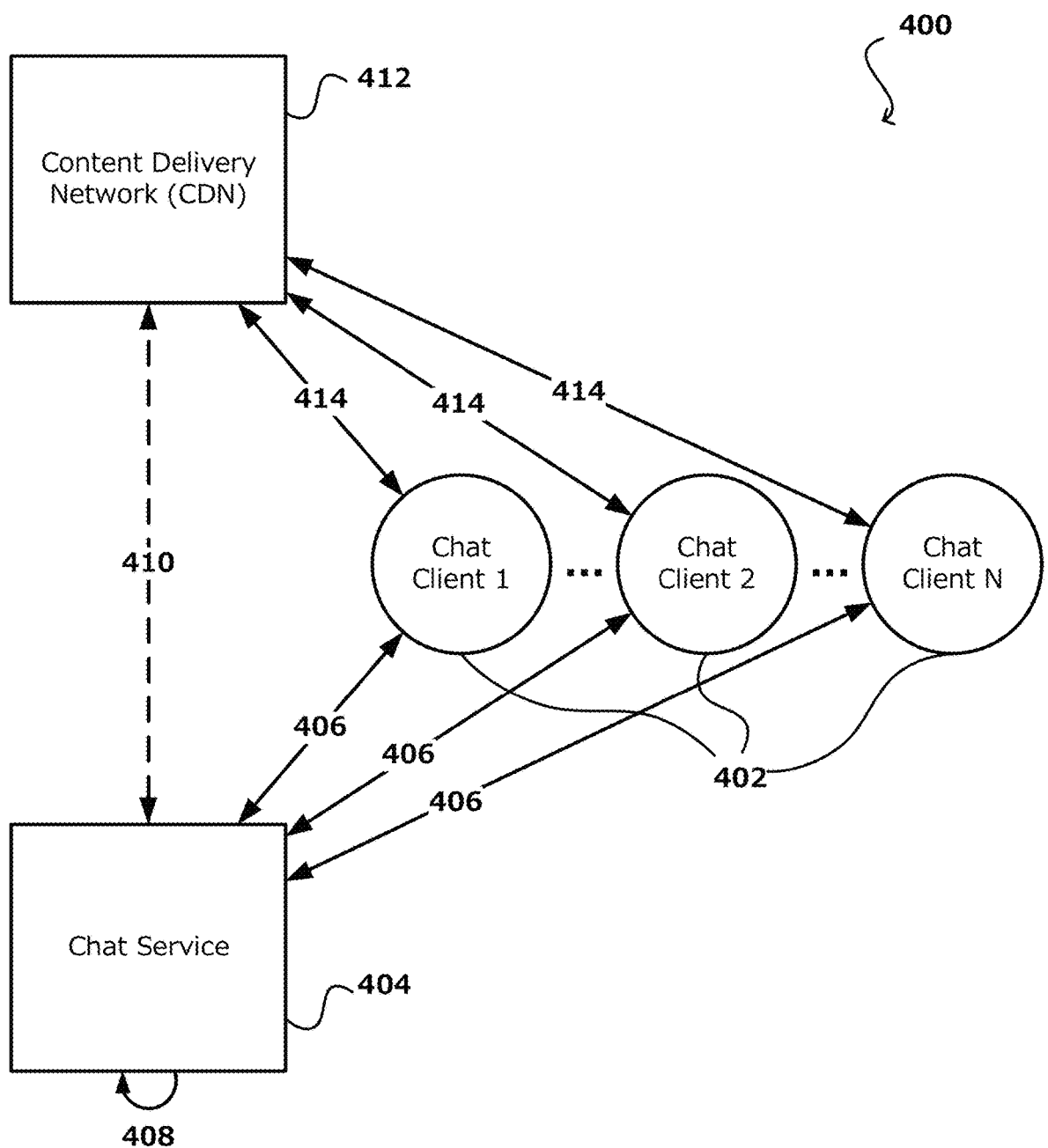
FIG. 4 illustrates an example system for distributing messages using a content delivery network that can be utilized in accordance with various embodiments.

FIG. 4 illustrates an example approach 400 to distributing messages using a content delivery network in accordance with various embodiments. As shown in FIG. 4, multiple chat clients 402 can connect to a chat service 404. As discussed, a chat client can be an application executing on a client device such as a smart phone, tablet computer, wearable computer, etc. When a chat client 402 connects to a chat service 404 the chat client can be assigned to a session, such as a chat room, with other chat clients 402. When the chat client 402 sends 406 message data to the chat service 404, the chat service can process 408 the message data.

In some embodiments the chat service 404 can process 408 each message, when message data is received, to determine the message's attributes. In some embodiments, message attributes can include message content features, message topic, sender information, etc. In some embodiments, natural language processing (NLP) techniques can be used to determine message content features, such as message content semantics (e.g., to determine the meaning of the content), spelling, grammar, and other features. For example, message content can be analyzed to determine a topic of a message, such as a subject described in the message. Message attributes may include other metadata, such as tags that indicate a message as being an answer to a previous message or specify a particular topic. In some embodiments, message content can be parsed to identify spelling and/or grammatical mistakes.

In some embodiments a message's value can be determined, in addition to message topic, based on a message content score (e.g., a value assigned based on the content of the message) and a user profile score (e.g., a value assigned based on the source of the message, connection speed, message history, etc.). The messages related to a topic can then further be filtered or selected based at least in part upon the message content score. A message's value may be determined based on attributes of the message. For example, questions, answers to past questions, messages that are on-topic, etc. may be assigned higher message content scores, leading to high message values. As discussed, NLP techniques can be used to determine message attributes, such as the semantics, spelling, grammar, and other features for a message. As an example, message content can be analyzed to determine whether the message is a statement or a question. A chat service 404 can assign a relatively high value to questions and a relatively low value to questions. For example, a question may be assigned a value of 10 while a statement is assigned a value of 1. In some embodiments, answers to questions may also be assigned a relatively high value. In some embodiments, message content can be parsed to identify spelling and/or grammar mistakes. Spelling and/or grammar mistakes can contribute to a lower message content score. For example, each spelling and/or grammar mistake can reduce the message content score by 0.1. A content score index can be maintained that associates different message content features with different score values. When the content is analyzed, an associated score for each identified content feature can be determined using the content score index. A message content score may be calculated based on the scores associated with each content feature.

In some embodiments, messages can be grouped based on the messages' values and/or based on the messages' attributes. For example, the chat service 404 can apply one or more distribution threshold values to the messages to group the messages based on message value. In some embodiments, the one or more distribution thresholds may include default values defined by the chat service. In some embodiments, a moderator or other administrator associated with a chat room may define the one or more distribution thresholds. In some embodiments, the one or more distribution thresholds may be received from a chat client and used to group the messages received by that chat client. For example, messages may be grouped into multiple groups such as a "verbose package" which includes all messages, a "high quality package" which includes messages having a value greater than a first threshold, and a "minimal message package" which includes messages having a value greater than a second threshold which is higher than the first. Chat clients with limited bandwidth or hardware constraints may select to receive the "minimal message package", whereas chat clients with more bandwidth may select to download the "verbose package". In some embodiments, where a chat service is paired with a content distribution service (e.g., a video content delivery service), the bandwidth requirements of the paired service can be used to determine which package of messages to receive. For example, a chat service can determine a connection bandwidth associated with a client device. If the chat service is paired with a video content delivery service, the chat service can determine a bandwidth requirement associated with the video content delivery service. The bandwidth requirement may be, e.g., a minimum bandwidth associated with the video content delivery service and/or may be a bandwidth requirement associated with a particular content item being provided. Using the connection bandwidth and the bandwidth requirement, the chat service can calculate an available bandwidth and assign the client device to a message package that can operate within the available bandwidth so as not to interfere with the video content delivery service.

In some embodiments, chat service can compile the messages into a message stream to upload the messages to a content delivery network (CDN). Each message can include metadata indicating one or more groups to which that message belongs. The CDN can use the metadata to sort the messages from the input message stream received from chat service 404 into various output message streams associated with the various groups of messages, such as may relate to specified topics, and used to distribute the messages to chat clients. In some embodiments, the chat service 404 can compile each group of messages into a different message file and distribute to the various chat clients or, in some embodiments, upload 410 the message files to the CDN 412. Each message file can include messages belonging to that group from a chat room over a particular time period. The message file can be an archive file, a delimiter separated value file, or other file that can include message data from multiple users. In some embodiments, the chat service 408 sends the CDN information to the chat client 402 to obtain 414 messages for that chat room in response to a chat client 402 joining a chat room. In some embodiments, a user can manually select a CDN from which to obtain messages for the chat room. Each group of messages may be streamed separately by the CDN. In some embodiments, the CDN information can include a URL or other location identifier associated with a message stream corresponding to a particular group of messages.

Figure 5:
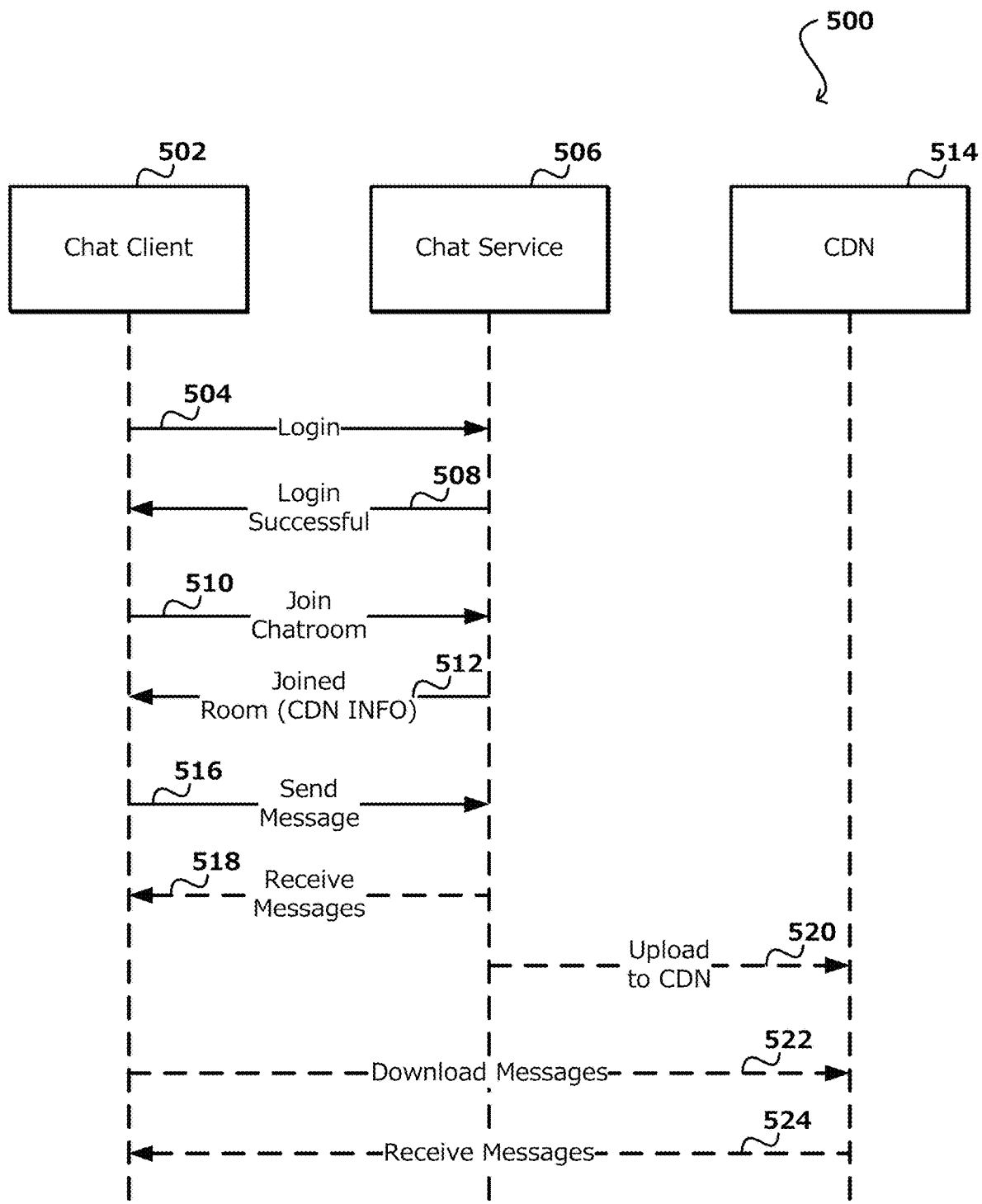
FIG. 5 illustrates an example sequence diagram illustrating message distribution using a content delivery network that can be utilized in accordance with various embodiments.

FIG. 5 illustrates an example sequence diagram 500 illustrating message distribution using a content delivery network, in accordance with various embodiments. In this example, a chat client 502 can send a login request 504 to a chat service 506. As discussed, the login request can include user credentials provided by the user through chat client 504. In some embodiments, the login request can include client device information (device name, device type, hardware configuration details, etc.) and connection details (available bandwidth, geographic location, etc.). The chat service 506 can verify the login credentials and return a login successful message 308.

The chat client 502 can then request 510 to join a session, e.g., a chat room. In some embodiments, the request to join a chat room can include a content identifier to reference a chat room associated with a content item provided by a content service (e.g., a video, an image, a product, etc.). The chat service 506 can identify a chat room associated with the content identifier and assign the chat client to the chat room. The chat service 506 can then send a message 512 to the chat client 502 indicating that the chat client has joined the chat room and cause the chat room to be displayed on the chat client. An example message 512 can include a chat room identifier and connection details for an associated content delivery network (CDN) 514. In some embodiments, connection details can include multiple addresses at the CDN 514, where each address is associated with a different group of messages distributed by the chat room. For example, the chat room may provide a first package of messages that includes all messages and a second package of messages that includes messages that have been assigned a value greater than a threshold value. In some embodiments, the addresses provided may depend on the user credentials used to login.

For example, if the user credentials are associated with a moderator account the CDN connection details may include a moderator package of messages that are shared first with moderators before being distributed to the entire chat room.

The chat client 502 may then send a message 516 to the chat service 506 to be shared with the assigned chat room. In some embodiments, the chat service 506 can confirm receipt of the message by replying to the chat client 502 with a copy of the message. The chat client 502 can then display the message with other messages received during that session (e.g., from other clients in the chat room). In some embodiments, a chat client 502 can display the message without receiving confirmation of receipt of the message by the chat service 506. The chat client 502 can display each message associated with the session using time stamp information associated with each message.

The chat service 506 can process the message. As discussed, processing the message can include analyzing the message to determine one or more message attributes and/or a message value. Processing may also include grouping the message with similar messages based on the attributes and/or by comparing the message value to one or more thresholds. In some embodiments the chat service can then provide the messages which can be received 518 to the chat client 502. In other embodiments, the chat service 506 can compile the message into a file and upload 520 the file to the CDN 514 for distribution to other users. The chat client 502 can connect to the CDN 514 to download messages associated with the assigned chat room. As discussed, the CDN 514 can provide streams associated with different groups of messages. The chat client 502 can connect to the CDN 514 to download 522 messages from the CDN. The CDN 514 streams 524 message data associated with at least one group of messages to the chat client 502. The chat client 502 can extract messages from the message stream and display the messages. The messages can be displayed based on timestamp information associated with each message. The chat client 502 can use the timestamp information to interleave messages received from the CDN 514 with messages sent by the chat client 502.

Figure 6:
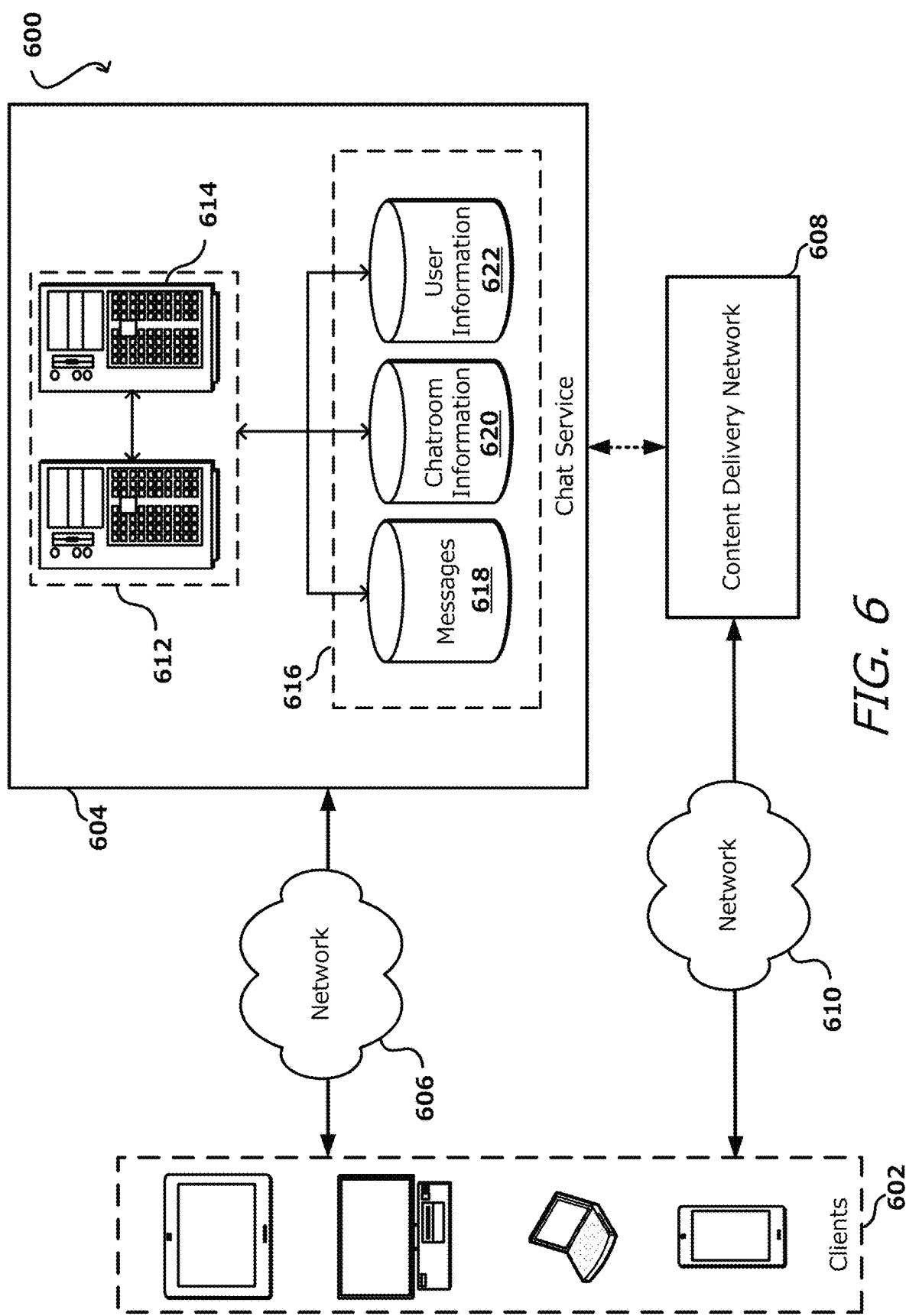
FIG. 6 illustrates an example system that can be used to implement aspects of the various embodiments.

FIG. 6 illustrates an example system 600 in which aspects of the various embodiments can be implemented. As illustrated in FIG. 6, various client devices 4602 can access a chat service 604 over a network 606. A client device may include any electronic device capable of displaying content and exchanging electronic messages such as smart phones, electronic book readers, tablet computers, notebook computers, personal data assistants, video gaming consoles, portable media players, and wearable computers (e.g., smart watches, smart glasses, etc.) among others. As discussed, a user can access chat service 604 using a chat client executing on the client device 602. As discussed, in some embodiments, chat service can distribute messages to client devices 602 directly or by using a content delivery network (CDN) 608, among other such options. Client devices 602 can connect to CDN 608 over network 610. In some embodiments, networks 606 and 610 may be the same network.

As shown in FIG. 6, a chat service 604 can include a server cluster 612 of multiple chat servers 614. Although two servers are shown in server cluster 612, this is for simplicity of description and depiction. A chat service 604 can include one or more server clusters 612, each server cluster including one or more chat servers 614. When a client 602 connects to the chat service 604, a client 602 can login with a chat server 614 using login credentials. Once the client is logged-in, the chat service 604 can assign the client 602 to a chat room. In some embodiments, when a client sends a message, the message can include message content entered by the user and a chat room identifier associated with the assigned chat room. The chat service 604 can maintain data 616 to manage messages across multiple chat rooms. In some embodiments, a chat service 604 can include a message cache 618 that stores messages as they are received for processing. As discussed further below, processing can include analyzing the messages to determine message attributes and/or a message value for each message. Messages 618 may be grouped based on the message attributes and/or message value before being distributed to other chat clients. In some embodiments, the chat service 604 can maintain chat room information 620 including an index of chat rooms and clients assigned to those chat rooms. The chat service 604 can also maintain user information 622, including user preferences such as message distribution preferences and login credentials.

In some embodiments, a chat service 604 can be paired with a content service, such as a video distribution service, to provide one or more chat rooms associated with content items. In some embodiments, a web browser or other application, can display both content provided by the content service and the associated chat client. A chat room provides a forum in which multiple users can discuss the associated content item. As discussed, as the number of users of a chat room grows, the bandwidth required to distribute those messages to each user of the chat room increases. Improved message management techniques are discussed further below.

In some embodiments, a token bucket approach can be used to manage the number of messages being sent. As used herein, a token represents an action that can be performed. The number of tokens that can be held in the "token bucket" indicates the maximum number of actions that can be performed. As messages are sent, tokens are removed from the token bucket. A refill rate can define how tokens are added to the token bucket as time progresses or as additional resources become available. If the token bucket is empty, the action cannot be performed until tokens are added. In this example, the action can represent sending a message. When messages are sent, tokens are removed. If no tokens are available, then no messages can be sent.

In some embodiments, each chat room can be associated with a different token bucket. The capacity of the token bucket and the refill rate can be set based on e.g., the number of users in the chat room. The capacity of the token bucket sets the maximum number of messages that can be sent in a particular time period and the refill rate sets the average message rate over the particular time period. When a user sends a message to the chat room, one token is removed from the bucket and the message is allowed. If the token bucket is empty, the message is rejected.

Additionally, or alternatively, in some embodiments network usage can be made more efficient. For example, messages can be compressed, increasing the number of messages that can be sent over a fixed amount of bandwidth. This effectively increases the capacity of the token bucket. Similarly, message size can be reduced by removing unnecessary data from the messages. Additionally, different network resources can be used to increase bandwidth, e.g., faster hosts.

In some embodiments, the time period during which a user can send messages can be limited. For example, each chat client may be enabled to send messages during particular time windows. The chat client can grey-out or otherwise disable the ability to draft messages. In some embodiments, a timer can show when functionality is to be restored. In some embodiments, when the chat client is disabled, messages may be drafted and queued to be sent when functionality is restored. Additionally, or alternatively, each user may be limited to a particular number of messages that can be sent. Users can "earn" additional messages by sending messages that are identified as being valuable. Messages can be identified as being valuable by other users or by the chat service. In some embodiments, a user can attach a "bounty" to a question, and the user who answers the question can earn additional messages based on the bounty.

As discussed above, the distribution of small messages to a large number of users requires a significant amount of bandwidth which typical messaging systems cannot accommodate. To address this issue, the distribution of messages can be treated like other high bandwidth content distribution, such as video streaming. Rather than sending data (e.g., messages) directly to users, the data can be sent to a content delivery network (CDN) 608 which is designed to efficiently distribute content to users. In some embodiments, the CDN 608 used to distribute messages can be a different distribution network than used by an associated content service. For example, a video distribution service and the chat service may each use different CDNs to distribute content. Alternatively, in some embodiments, the content service and the chat service may use the same CDN to distribute content and messages. Each user can be sent address information for the data which can be used to retrieve the data from the CDN. This removes the network pressure from the chat service.

As mentioned, approaches in accordance with various embodiments can attempt to select and/or filter at least some of the chat messages, or other such content, to be displayed on a computing device based at least in part upon one or more actions detected and/or determined by, or with respect to, the computing device. In various examples, this can include capturing image data using at least one camera, or other imaging sensor or component, to attempt to obtain a representation of at least a portion of a face of a user of the computing device. In various approaches, the captured image data can be analyzed using pattern matching, feature detection, image matching, or another such processes to attempt to recognize features corresponding to a representation of a face in the captured image data. The portion of the image data corresponding to the face can then be analyzed, on the computing device or using a remote system or service in communication with the computing device to attempt to identify features and locations corresponding to the eyes, pupils, and other such features of the user's face. These features and locations can be used to determine aspects such as the relative orientation of the user to the computing device, as well as the relative orientation of the eyes or pupils of the user with respect to the remainder of the user's face.

As mentioned, in order to determine which content is being viewed by a user, at least some embodiments can attempt to determine the gaze position (or gaze direction, viewing location, etc.) of the user with respect to the content and/or the device displaying the content. In some embodiments, at least one camera (or other image capture element) of a computing device is used to image at least a portion of a user. The image capture element can utilize ambient light surrounding the device or user, or can rely upon light emitted from a display element, light emitting diode (LED), or other component of the electronic device. In other embodiments, at least one image capture element is used that captures infrared (IR) or other radiation emitted from a component (e.g., an emitter such as an IR light emitting diode (LED) or laser diode) of the computing device, and reflected by the user. In some embodiments, both an ambient light camera and one or more infrared detectors are used to determine aspects of relative position and/or movement.

Certain approaches can utilize image recognition to track aspects of a user for use in providing input to the device. For certain portable or low power devices, however, standard image recognition using ambient light and full color images may not be optimal, as the analysis can require a significant amount of processing capacity, resource usage, and battery power. Further, for content control purposes it can be desirable in at least some embodiments to monitor the user at a rate of 30 frames per second or faster, which can be difficult (or at least particularly resource and power intensive) when full color images must be analyzed. In some cases a significant amount of the processing can be pushed to a remote processing system, but latency, bandwidth, and other such issues can prevent such an approach from working effectively in all cases.

Accordingly, several embodiments described and suggested herein utilize infrared (IR) radiation, or other ranges of radiation that are outside the range of viewable light that is detectable by a human user. In addition to being imperceptible by a user, such that the user experience is not degraded if the user is illuminated with such radiation, IR can provide a relatively inexpensive tracking mechanism by taking advantage of the properties of the human eyes to obtain at least one point source. For example, the human retina is a retro-reflector, such that light is reflected back at substantially the same angle in which the light was incident on the retina. Thus, light from one angle will not be reflected back from the retina along another (substantially different) angle. Further, the human eye absorbs certain wavelengths, such that light of one wavelength may be reflected by the retina while light of another wavelength may be absorbed by the cornea and/or other portions of the eye, or otherwise not reflected back.

These properties enable two images to be captured that can be low-color or grayscale in nature, as the portions of interest will either show reflection, or show little to no reflection, at the position of the pupils, for example. If one image is captured that includes the reflected light from the retinas, and another image is captured that does not include the reflected light, the images can be compared to quickly determine the relative location and dimensions of the user's pupils (or other such features). Since other features of the user will generally reflect the same for each image, an image comparison can readily reveal the relative position of the pupils without a significant amount of image processing.

In various embodiments, a running difference can be performed between images including (and not including) the light reflected from the retinas. Subtracting the absolute values of the pairs of images will leave substantially two disc-shaped features corresponding to the relative positions of the user's pupils (as well as those of anyone else in the view) such that changes in position or direction can quickly be determined and monitored over time. There can be features in the subtracted image pairs that result from movement or other occurrences, but these features typically will not be disc shaped and can readily be removed from consideration.

In some embodiments, a conventional digital camera or similar device can be used to perform a rough head location for a user. Any of a number of conventional image analysis approaches can be used to approximate the head position of a user based on captured images and/or video frames. This approximation can be used to further reduce the resources needed to process IR images, for example, as the device can know ahead of time the approximate location of the user's head and can exclude areas substantially outside that area from consideration or analysis. In some embodiments that must account for image offset due to the use of multiple cameras, a representative portion can be selected from one IR image, such as may be based upon distinctive features or some other such aspect within the determined head region of the user, and an algorithm can attempt to match that portion with a region of the other IR image that can be based, at least in part, upon the head position of the user. The matching process thus can use a sliding window and utilize a maximum match value, minimum difference value, or other such value to determine the likely match position. An additional benefit of determining the image offset for the match position, in addition to being able to align the images, is that the offset can indicate an approximate distance to the object (e.g., user) being imaged. The distance can be useful in properly interpreting movement, such as to determine gaze direction of a user.

As mentioned, a computing device can include at least one image capture element for capturing image information about the user of the device. The imaging element may include, for example, a camera, a charge-coupled device (CCD), a motion detection sensor, or a radiation sensor, among many other possibilities. An example device includes at least one IR emitter and at least one IR detector. In other embodiments, as discussed herein, a device could instead include two ambient light cameras in place of the two detectors and can utilize ambient light and/or light from the display element. The IR emitter can be configured to emit IR radiation, and each IR detector can detect the IR radiation reflected from a user (or other such surface or object). If there are multiple IR detectors, offsetting the detectors can cause each detector to detect radiation reflected at different angles.

In one example, a first IR detector can be positioned substantially adjacent to the IR emitter such that the first IR detector will capture infrared radiation reflected back from a surface, such as a viewer's retinas, in a direction that is substantially orthogonal to the capture plane of the detector. A second IR detector positioned a distance away from the IR emitter will only detect IR radiation reflected at an angle with respect to the orthogonal direction. When imaging a retro-reflector such as a user's retina, the second IR emitter will detect little to no reflected radiation due to the IR emitter, as the retina will not significantly reflect in the direction of the second emitter (although defects, particulates, or variations may deflect some of the radiation). As discussed later herein, this difference among images can be used to determine the position (and other aspects) of the retinas of a user, as the difference in IR reflection between the two images will be significant near the pupils or other such features, but the remainder of the images will be substantially similar.

In an alternative embodiment, a computing device utilizes a pair of IR emitters (e.g., IR light emitting diodes (LEDs), IR laser diodes, or other such components), to illuminate a user's face in a way that is not distracting (or even detectable) to the user, with the reflected light being captured by a single IR sensor. The LEDs are separated a sufficient distance such that the sensor will detect reflected radiation from a pupil when that radiation is emitted from the LED near the sensor, and will not detect reflected radiation from the pupil when that radiation is emitted from the LED positioned away from the sensor. The sensor can capture IR images that enable the device to analyze features of the user that reflect IR light, such as the pupils or teeth of a user. An algorithm can attempt to calculate a position in three-dimensional space (x, y, z) that corresponds to a location equidistant between the user's eyes, for example, and can use this position to track user movement and/or determine head motions. A similar approach can be used that utilizes a single IR emitting diode and a pair of IR sensors, as discussed above. Thus, the device can either direct IR from two locations or detect IR from two locations, with only one of those locations receiving retro-reflected radiation from a user's retinas. Other embodiments can utilize other approaches for performing head tracking, such as by requiring a user to wear glasses that emit IR radiation from a point source, etc.

In some embodiments it can be preferable to utilize a single emitter and two cameras when using single wavelength IR (e.g., 940 nm) in two directions, as using a single camera might be cheaper but also requires that images from the different directions be captured at different times. A downside to capturing images at different times is that movement during that period can affect the determination, even for capture frequencies on the order of 30 Hz (or 15 Hz for two cameras to get the same resolution). An advantage to a multi-camera system is that the images can be captured substantially simultaneously, such that movement between images is minimized. A potential downside to such an approach, however, is that there can be optical variations in the images due to the images being captured from two different points of view.

In one embodiment, a single detector can be used to detect radiation reflected at two different wavelengths. For example, a first LED could emit radiation at a wavelength (e.g., 940 nm) that is reflected by the retina, and a second LED could emit radiation at a wavelength (e.g., 1100 nm) that is absorbed by the cornea and/or other portions of the human eye. Alternatively, a single LED can be used that is able to emit (by itself or through use of optics or filters) radiation at both wavelengths, concurrently or otherwise. Specific wavelengths can be selected within selected wavelength ranges, based at least in part upon their reflective properties with respect to the human eye. For example, experiments indicate that light has less than a 50% absorption rate (for the typical human eye) under about 940 nm, above 50% absorption between about 940 nm and about 1030 nm, around 50% absorption for wavelengths between about 1040 nm and about 1100 nm, and about 100% absorption at 1150 nm and above. Thus, emitters can be selected that fall within at least some of these ranges, such as a first IR emitter that has significantly less that 50% absorption and a second IR emitter that has significantly greater than 50% absorption. The specific wavelengths can further be based, in at least some embodiments, upon the wavelengths of available devices. For example, an available laser diode at 904 nm can be selected that has a relatively low absorption rate, and an available laser diode at 980 nm or 1064 nm can be selected that has a relatively high absorption rate. In some embodiments, the power output of the higher wavelength diode can be scaled up to substantially match the perceived brightness of the lower wavelength diode by a CMOS sensor (or other such detector), the sensitivity of which might fall off to around zero at a value of about 1100 nm, such that in at least one embodiment the two emitters have wavelengths of 910 nm and 970 nm).

An advantage to using two wavelengths is that the LEDs can emit the radiation concurrently, as long as a resulting image is able to be decomposed in order to extract image information corresponding to each wavelength. Various approaches for decomposing such an image are discussed elsewhere herein. The LEDs then could both be positioned near the camera, or a single LED or emitter can be used near the camera if that LED operates at (at least) the two frequencies of interest.

The emitter(s) and detector(s), and any ambient light camera(s) or other image capture element(s), can be positioned on the device in locations that are least likely to interfere with the user's operation of the device. For example, if it is determined that average users hold the device by the middle of either side of the device and primarily on the right side or on the bottom of the device, then the emitter and detectors can be positioned at the corners of the device, primarily on the left-hand side or top of the device. In another embodiment, there may be additional IR emitters (not shown) positioned on the device that transmit IR at different frequencies. By detecting which frequencies are received by the detectors, the device can determine specific information as to the orientation of the users gaze.

In some embodiments, it might be useful for a user to participate in a calibration process which accounts for aspects such as the strength of eye reflection from the user, as well as to determine dimensions, calibrate gaze direction determinations, etc. Such an approach also can be useful if a user uses glasses that reduce the reflective capability, etc.

In order to determine the gaze position of a user in at least some embodiments, one or more images are captured using one or more cameras or image capture elements as discussed herein. Once images of the user's face are obtained, one or more algorithms can analyze the images to attempt to determine information about the images, such as the location of specific features in each image. As discussed above, certain embodiments utilize information about the user's eyes to attempt to determine information such as relative movement between the computing device and the user, as well as changes in gaze direction of the user. As discussed, a imaging element of a computing device can capture an image of at least a portion of a user of the device when the user is in front of the device (or at least within the viewing angle of an imaging element of the device), such as would normally occur when the user is viewing the display element of the device.

If the device includes software and/or hardware that is able to locate at least one feature of the user that can be consistently determined, such as the eyes, nose, or mouth of the user, then the device can analyze the image information to determine relative motion over a period of time and utilize that relative motion as input. In some embodiments, the device is able to distinguish between movement of the user and movement of the device, such as by detecting movement of a background or other aspect of the images, or by analyzing the separation, shape, or size of various features. Thus, in embodiments described anywhere in this description that use an imaging element to determine an orientation or location of the device relative to its user, a user can have an option of inputting a given type of motion, corresponding to a specific command, by moving the device or altering an aspect of the user, or both.

In some cases, relative movement could be open to multiple interpretations. As should be apparent, different actions can correspond to the gaze position of the user's eyes moving in different directions with respect to the displayed content and/or display screen. In some embodiments where it may be desirable for the process to utilize a fairly simple imaging element and analysis approach, it can be desirable to include at least one orientation determining element (e.g., an accelerometer or gyro) in the device that is able to determine a current orientation of the device. In one example, the at least one orientation determining element includes at least one single- or multi-axis accelerometer is used that is able to detect factors such as three-dimensional position of the device, the magnitude and direction of movement of the device, as well as vibration, shock, etc. Other elements for detecting orientation and/or movement can be used as well within the scope of various embodiments for use as orientation determining element. When the input from an accelerometer is used with the input from the camera, the relative movement can be more accurately interpreted, allowing for more accurate gaze tracking. For example, use of an accelerometer can help to determine how much determined relative motion is due to motion of the device and not a change in gaze direction of the user.

The computing device can store, or otherwise have access to, at least one algorithm to analyze the captured images, as may be stored at least temporarily on the device itself, or can send the images to be analyzed by a remote computer or service, etc. Any of a number of algorithms can be used to analyze images, detect features, and track variations in the positions of those detected features in subsequent images. For example, FIG. 7A illustrates an image of a face 700 of a user of a device as could be captured (e.g., obtained or imaged) by an imaging element of the device. Thus, the face 700 is depicted as perceived by the imaging element of the device. As can be seen in FIG. 7A and also in the eye-specific view of FIG. 7B, there are various aspects of the user's face that can be located and measured, such as the perceived width and height of a user's eyes, the perceived relative separation of a user's eyes and the perceived relative position of the user's eyes to an edge of the user's face when facing the device. Any number of other such measurements or aspects can be used as should be apparent. When a user tilts or translates the device, or moves his or her head in any direction, there will be a corresponding change in at least one of these measured aspects in subsequent images that are obtained. For example, if the user tilts his or her head right or left, the horizontal distance f in FIG. 7A between the user's eyes and an edge of a side of the user's face will change. In a similar manner, if the user tilts his or her head up or down, the vertical distance g between the user's eyes and an edge of the top of their head will change. Further, the shape or horizontal measurements a and b and the shape or vertical measurements e and h of the user's eyes will change and can change by different amounts. The separation distance c between the eyes can change as well. Using such information, the device can determine a type of motion that occurred and can use this information to help interpret the movement of the user's pupils or other such information.

For example, FIGS. 8A, 8B, and 8C illustrate movements 800 of a user's pupils with respect to the user's eye position that can be determined in accordance with various embodiments. In some embodiments, the user's pupil position relative to the user's eye position can be at least partially indicative of the gaze direction of the user. For example, assuming the user is facing toward the device, in FIG. 8A the user is gazing forward, while in FIG. 8B the user is gazing downward and in FIG. 8C the user is gazing to the left (in the figure). Such information by itself, however, may not be sufficient to determine gaze direction. For example, if the user had tilted his or her head up (or back) while making the pupil movement in FIG. 8B, the user might actually be looking forward (or even 'up' relative to the previous position). Further, if the user translates his or her head to the left or right in FIG. 8A, but does not adjust the position of the pupils with respect to the user's eyes, then the gaze position would actually change even though the user is still looking straight ahead. Thus, in certain embodiments, it can be advantageous to utilize facial measurement approaches to interpret the pupil movements of FIGS. 8A through 8C.

In some embodiments, the accuracy of the image capture and detection can be such that gaze direction and/or field of view can be determined based substantially on pupil-related information. In one embodiment, image analysis can be performed to locate the position of the user's pupils. The dimensions of the pupils themselves, as well as position and separation, can be indicative of changes in the user's gazing direction. For example, in addition to determining that pupils move from left to right in adjacently-captured images, the device can determine, due to small changes in the width of each pupil, whether the user position with respect to the device has translated. Similarly, the device can determine whether the user rotated his or her eyes, which would result in changes in diameter since the eyes are spherical and changes in rotation will result in changes in the captured dimensions. By being able to precisely measure pupil-related dimensions, the device can track the field of view of the user with respect to the device.

Another benefit to being able to accurately measure pupil-related dimensions is that the device can also determine a focus depth of the user. For example, if the user focuses on a point "farther away" from the user, the device can detect a change in separation of the pupils. Because the device can also measure the dimensions of the pupils in the image, the device can also determine that the increase was not due to an action such as a decrease in the distance between the user and the device. Such information can be useful for three-dimensional images, for example, as the device can determine not only a gaze position, but also a depth at which the user is focusing in order to determine where the user is looking in three-dimensional space.

While user information such as pupil measurements can be determined through various image analysis approaches discussed above, conventional image analysis algorithms are relatively processor-intensive and can require a significant amount of memory. Conventional portable devices, such as cellular phones and portable media players, might not have the necessary resources to perform such real-time image analysis, particularly at the resolution needed to detect small variations in pupil diameter. Further, in order for the image capture to work there must be a sufficient amount of ambient light, such that if a user is reading an electronic book on a device with a display such as an electronic paper display that does not generate significant illumination as would an LCD or similar display element, there might not be enough light to adequately capture the necessary image information.

FIGS. 9A through 9C illustrate an example process for determining pupil or retina parameters using infrared radiation that can be used in accordance with various embodiments. In this example, a first image is shown in FIG. 9A that was captured using a sensor positioned near an infrared source, such that each retina substantially reflects the infrared radiation back towards the sensor. FIG. 9B illustrates another image captured using a sensor positioned away from an infrared source, such that any IR radiation reflected by the retinas is not directed towards, or detected by, the sensor. Thus, as can be seen, the major significant difference between the two images is the reflection by the retinas. Using simple image comparison or subtraction algorithms, for example, the retinas can quickly be extracted from the images once the images are aligned using a process such as those discussed above. If noise is sufficiently filtered out, using any appropriate method known in the art, the resultant image in FIG. 9C will include substantially only the reflection from the retinas, which can quickly be analyzed with very little resource allocation.

As with the analysis of conventional full-color images described above, however, the resolution of the IR-based approach described above might not be sufficient to track gaze direction or field of view for all applications. In such cases, it can be beneficial to utilize additional input mechanisms and/or additional IR emitters and detectors to help interpret or enhance the captured information. At least some of these additional elements shall be referred to herein as "environment-determining input elements," as the additional elements are operable to determine at least one aspect relating to the environment surrounding the device, such as light or noise surrounding the device, a relative orientation of the device to the surroundings, whether a user is holding the device, etc. While use of IR emitters and detectors are described herein, any type of facial or movement recognition technique may be used with the embodiments described herein.

As mentioned, in some embodiments there may be some inaccuracy due to the fact that the images being compared are not captured simultaneously. For example, in some embodiments a single detector is used to capture images using light of different wavelengths, IR radiation reflected from different IR emitters, or other such sources of reflected radiation. If there is rapid movement during image capture, an offset between images can be difficult to determine, as the positions of features will not be the same in both images, even taking the standard image offset into account. For a device attempting to determine gaze direction based on pupil location in a set of images, the result can be inaccurate as the gaze direction and/or eye position might be different in each image.

It thus can be desirable in at least some embodiments to capture the images with as little delay as possible. An approach in accordance with at least one embodiment takes advantage of the fact that many image capture elements do not capture an entire image simultaneously, as with conventional film-based cameras, but instead capture an image one scan line at a time. Thus, a digital camera, webcam, or other capture element having a sensor array corresponding to potentially millions of pixels can capture an image by scanning from a top row (or scan line) of the array down the array of sensors one row (or scan line) at a time. It should be understood that the orientation in which the sensor array operation is described is presented only for convenience of explanation, and that any appropriate orientation, scan direction, or other aspect or approach can be used as well within the scope of various embodiments.

Figure 10:
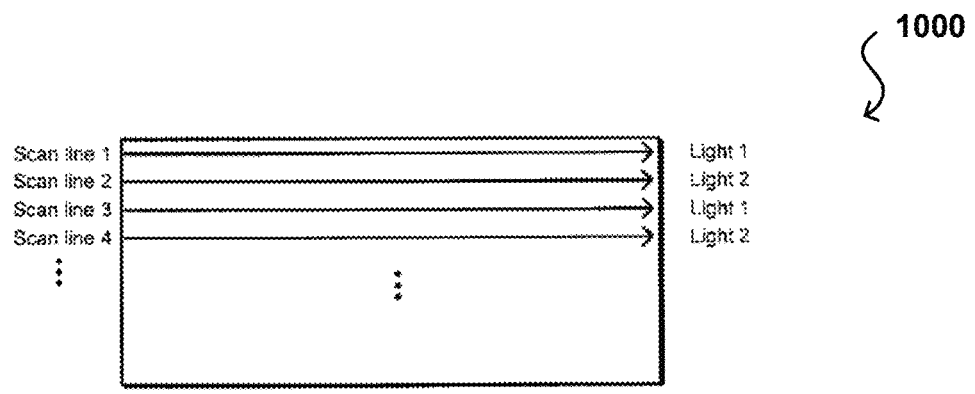
FIG. 10 illustrates an example imaging approach that can be utilized in accordance with various embodiments.

If the computing device utilizes two radiation sources, such as two infrared emitters of substantially the same wavelength at different positions on the device or two emitters of different wavelength, for example, and if the switching speed of those radiation sources is sufficient, the radiation sources can be turned on and off such that every other scan line captures radiation reflected for one of the radiation sources. For example, FIG. 10 illustrates an example situation 1000 wherein there are a number of scan lines for an image capture element, and the radiation captured for each scan line can be alternated between light sources. In some embodiments, a controller can be in communication with the capture element and the radiation emitters such that the emitters are switched between scan lines of the capture element.

Figure 11:
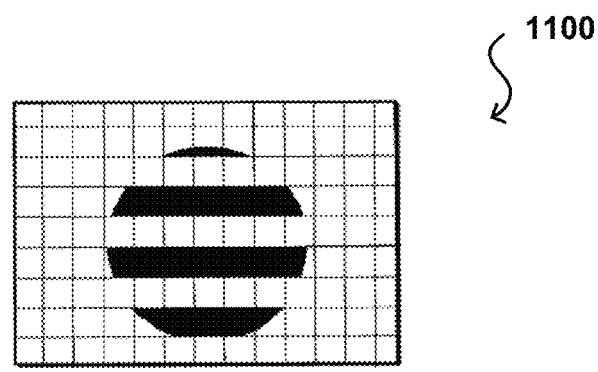
FIG. 11 illustrates an example image that can be captured using the approach of FIG. 8.

FIG. 11 illustrates an example of an image 1100 that can be captured using such an approach. In this example, the image captures IR light reflected from the pupil of a user, with a first light source being retro-reflected by the retina and a second, off-axis light source not being reflected to the capture element. As illustrated, a single image can essentially capture information for both light sources simultaneously, although at a slightly lesser resolution. The ability to capture the information in a single image significantly reduces the effects of movement on the position of features imaged using both light sources. Further, using a single capture element can reduce cost and eliminate parallax effects or distortion on the image(s).

As discussed, the time between capturing images using alternating light sources can be drastically reduced. For example, a sensor with 600 rows previously would have to capture all 600 scan lines of an image for one light source before switching to capture information for the other light source. By switching on each scan line, information for the other light source can be captured on the very next scan line, reducing the time between information capture to about 1/600 of the previous time.

In some cases the emitters may not be able to switch at the speed needed to alternate scan lines for the capture sensor. In one embodiment, the speed between line captures of the sensor can be slowed enough to enable the switching. In another embodiment, there can be more than one source used for each type of light (e.g., orthogonal vs. off-axis or different wavelengths) such that each source can be activated for every fourth or sixth scan line instead of every second scan line, for example. In yet another embodiment, assuming sufficient resolution of the capture sensor, the light sources can be switched every third, fourth, fifth, or six line, etc., instead of every other scan line. Such an approach can enable the information to be captured for two or more light sources in a single image, while still using a conventional capture element and accounting for the switching speed of the light sources. Other timing factors can be considered as well, such as edges (e.g., ramp-up times or tails) of the intensity of the light from a given source, as the source will not have perfect "on" and "off" transitions, or hard edges, but will take a short period of time to turn on and off.

Figures 12A, 12B:
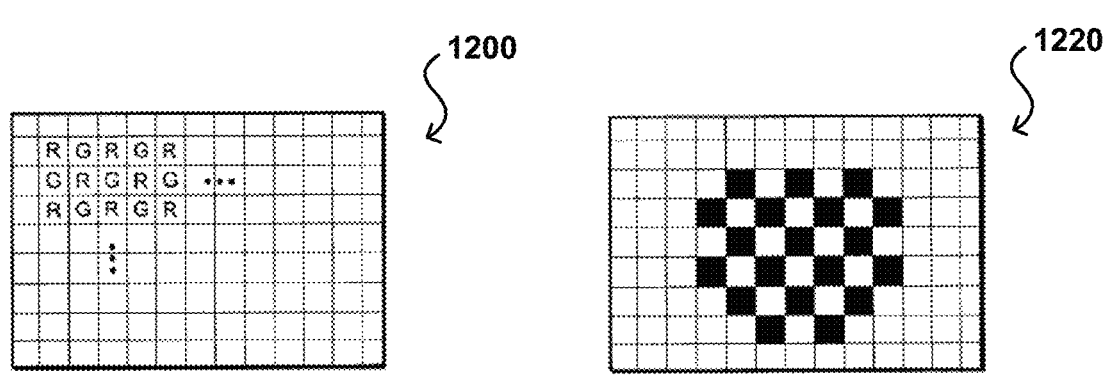
FIGS. 12A and 12B illustrate an example imaging approach that can be used in accordance with various embodiments.

FIGS. 12A and 12B illustrate another example approach to distinctively capturing light reflected from more than one light source in a single image that can be used in accordance with at least one embodiment. Color filters such as Bayer filters are known in the art for selectively capturing light of a specific color at certain pixels of a sensor array, particularly for single-chip digital image sensors. Traditional Bayer filters include red, blue, and green filters (with twice as many green filters as red and blue filters), such that adjacent sensors will capture the intensity of light of different colors, and the array as a whole will only capture intensity of light for those three colors.

Approaches in accordance with various embodiments can utilize a different type of filter to selectively capture radiation reflected at different wavelengths. As discussed, a computing device can utilize two radiation sources, with one source in the range of wavelengths that is reflected by the human retina and another source in the range of wavelengths that is not reflected by the human retina (or that is absorbed by the cornea, for example). FIG. 12A illustrates an example filter 1200 that can be used with such a device. In this example "R" is used to refer to light of a first wavelength range and "G" is used to refer to light of a second wavelength range, but it should be understood that these letters are merely selected for convenience and do not infer specific requirements on the wavelength range of the filter. Further, although a substantially equal distribution of filter elements is shown for both ranges, it should be understood that the distribution can be uneven as well in other embodiments.

Using such a filter 1200, two radiation sources of different wavelengths, a single wide-band radiation source, or another such source of multiple wavelength radiation can be used to simultaneously illuminate the face of a user (or other aspect of an object or element of interest). Using the filter, a single image can be captured using a single sensor (e.g., a conventional CCD or CMOS sensor) that will reflect information for both wavelength ranges. For example, FIG. 12B illustrates an example image 1220 corresponding to the reflected light from a user's retina that can be captured using such an approach. As illustrated, adjacent pixels (or groups of pixels) indicate the intensity of light from each of the two wavelength ranges. In this example, the first wavelength range that is reflected from the retina is shown by dark areas in the image, while the corresponding second wavelength range that is not reflected by the retina does not appear dark at those positions in the image. If the resolution of the sensor array (and filter) is sufficient, this single image can be used to locate the position, size, and other aspects of a user's pupils (and other such objects).

Although many of the examples above provide for aligning images or capturing images that include distinguishable information for at least two sources, such approaches still can be insufficient in at least some embodiments to provide the level of precision needed to accurately provide input to a device. For example, if the device is tracking gaze direction then the device might need to also know how far away the user is from the device, in order to determine the appropriate angle corresponding to a lateral shift in position of the user's pupils. For example, a user a foot away from the device will show a much different change in pupil position in a captured image than a user three feet away from the device, even though the actual physical amount of movement might be the same. While aspects such as the separation and size of the pupils can be an indication of distance, variations between users (e.g., adults versus small children) can affect the precision of such determinations.

Figure 13A:
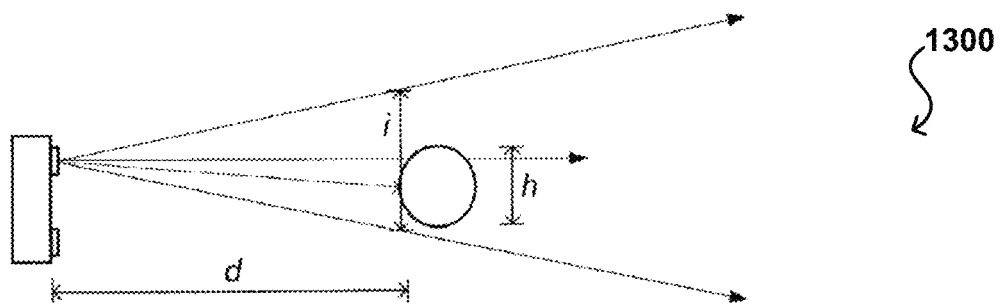
FIGS. 13A, 13B, 13C, 13D, and 13E illustrate an example process for determining distance to a user based on image offset that can be used in accordance with various embodiments.
Figure 13B:
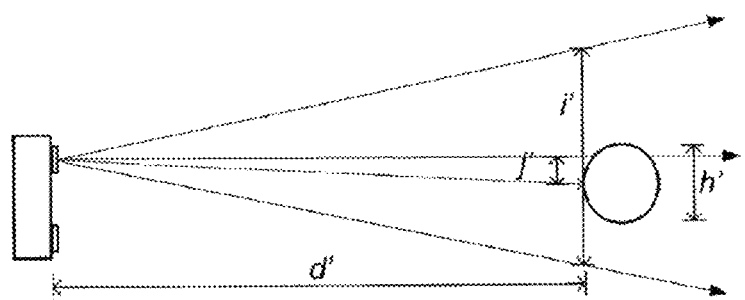

Accordingly, it can be desirable in at least some embodiments to also determine the distance to a user captured in the images. In some cases, a relative distance can be determined at least in part by determining the apparent size of an object in the image with the known size (or an approximate size) of the object. For example, as illustrated in the example 1300 of FIG. 13A, the distance to an object with height (in the figure) h will affect how large the object appears in the image. At a first distance d, the image height (based on the field of view at a current level of zoom) will be a height i, and the relative size of the object in the image will be given by h/i, where in FIG. 13A the object takes up approximately 50% of the height of the image. As illustrated in FIG. 13B, as the distance to the object increases to a distance d', the image height for the field of view at that distance is a larger height i', but the height of the object is the same. The apparent height of the object in the image will decrease, however, as the ratio of h/i now yields a value of approximately 30% of the overall height in the image. For objects with known height captured with a capture element with a known field of view, for example, an algorithm can determine an approximate distance to that object based on the relative size of the object in the image.

In many cases, however, the precise size of the object might not be known. For example, multiple users might utilize the device where each user can have features of different sizes. Further, users might alter their appearance, such as by changing a hair style, growing facial hair, or putting on weight, such that the calculation can be imprecise even for a known user.

Figure 13C:
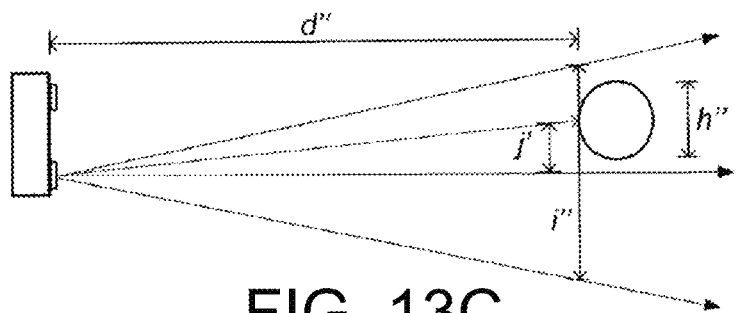

Several embodiments discussed above capture images of a common object (e.g., a user) from multiple angles. Using parallax-type information, it is possible to get an improved measure of distance by utilizing a parallax analysis of the relative displacement or offset of the object between the images. For example, in FIG. 13B the distance from the center of the image to the center of the object (or a feature at the front center of the object) is given by a distance j'. FIG. 13C shows the field of view for the second image capture element, separated a distance from the first image capture element. As can be seen, the distance from the center of the second image to the center of the object is a different distance, here a distance j'. As should be understood, the directions of the offsets can be the same or opposite in the images. The values of j and j' will necessarily increase with an increase in distance to the object. Thus, a determination of distance can be measured using the offset of a feature position in the two images. An advantage to such an approach is that the actual size of the feature does not matter as long as a consistent point is determined for the feature in each image that can be used to determine the offset.

Figure 13D:
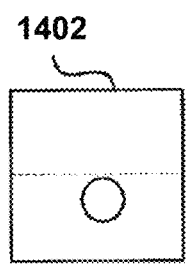
Figure 13E:
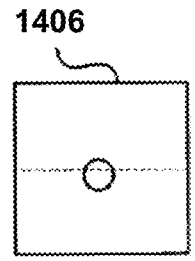

In some cases, a combination of such approaches can be used to improve accuracy. For example, the information that can be obtained from an image can be limited to at least some extent by the resolution of the imaging element. Thus, combining distance measurement approaches in some embodiments can provide a more precise determination of distance. For example, FIG. 13D illustrates a first image 1302 and a second image 1304 of an object taken at a first distance, captured with respective first and second image capture elements. FIG. 13E illustrates the same first image 1302 and second image 1304 captured with the object at a second distance, greater than the first distance. As can be seen, the overall offset (the sum of j+j') of the object in FIG. 13D is greater than the overall offset (the sum of j+j') of the object in FIG. 13E. Thus, through proper calibration and analysis the device can make a first determination of distance based on the relative offset, which changes in proportion to the distance to the object. Also as can be seen, the apparent size of the object changes between FIG. 13D and FIG. 13E. In embodiments where the device tracks the object, changes in apparent size also can be indicative of distance to the object. In embodiments where a user is recognized, such as through facial recognition or another such process, the apparent size also can be used to determine an initial distance to the user captured in a first image or set of images. In some embodiments, both approaches can be used and the results combined, with or without any weighting. As should be apparent, embodiments can use one or both of these approaches, and/or can combine one or both of these approaches with at least one other measurement approach known for such purposes.

Not all computing devices contain two emitters or detectors (or other such devices) positioned a sufficient distance apart on a device to determine distance using parallax. Still other devices might not rely solely (or at all) upon parallax to determine distance to a user or other object of interest. Accordingly, certain devices can utilize other mechanisms (in addition or alternative to apparent size in captured images) to attempt to determine distance.

Thus, through careful calibration (and possibly periodic recalibration) of the imaging optics, an algorithm or process can determine the approximate distance to an object based at least in part on the effective focal length. In some embodiments, an ambient camera might be used to focus on the user (and potentially provide other information such as user identity), and an infrared configuration might be used to detect gaze direction. Various other approaches can be used as well as discussed elsewhere herein. An advantage to such an approach is that the determination of distance and the capture of an image can be substantially simultaneous, such that movement of the user will not significantly impact the measurements. In some embodiments the focus will automatically adjust and track the position of the user, such that the position will be substantially accurate as long as the user does not move faster than the focusing optics can adjust. In some embodiments, the device can determine when an image was captured while a user was moving or otherwise out of focus, and that image can be discarded and/or a new image captured when the user is back in focus. Other methods for tracking and determining accuracy can be used as well within the scope of the various embodiments.

A number of other approaches can be used as well within the scope of the various embodiments. For example, thermal imaging or another such approach could be used to attempt to determine and track the position of at least some aspect of a human user. In many instances the imaging system is desired to be small and inexpensive enough for mass marketing, such that simple or conventional imaging approaches and components can be preferred. Certain existing cameras can detect infrared radiation, but typically utilize an IR filter. Utilizing these cameras without the IR filter, and potentially with an ambient light filter, allows these relatively inexpensive cameras to be used as IR detectors.

Other conventional elements can be used to reduce the cost of a computing device able to perform approaches discussed herein, but might be less accurate and/or might require a larger device. For example, images can be split using beam splitters (e.g., silvered mirrors) such that half of the reflected light gets reflected to a different location (e.g., part of a sensor). Similarly, various optical elements such as an optical interferometer can be used to attempt to obtain accurate distance measurements.

As discussed with any optical approach, it can be desirable to perform at least an initial calibration procedure, as well as potentially additional and/or periodic recalibration. In one embodiment where two cameras are used, it can be advantageous to periodically capture images of a grid or similar pattern in order to calibrate for bends or physical changes in the optics. In some embodiments where an initial calibration is performed during the manufacturing process, the user might only need to have the device recalibrated when performance begins to degrade, or at any other appropriate time.

Figure 14:
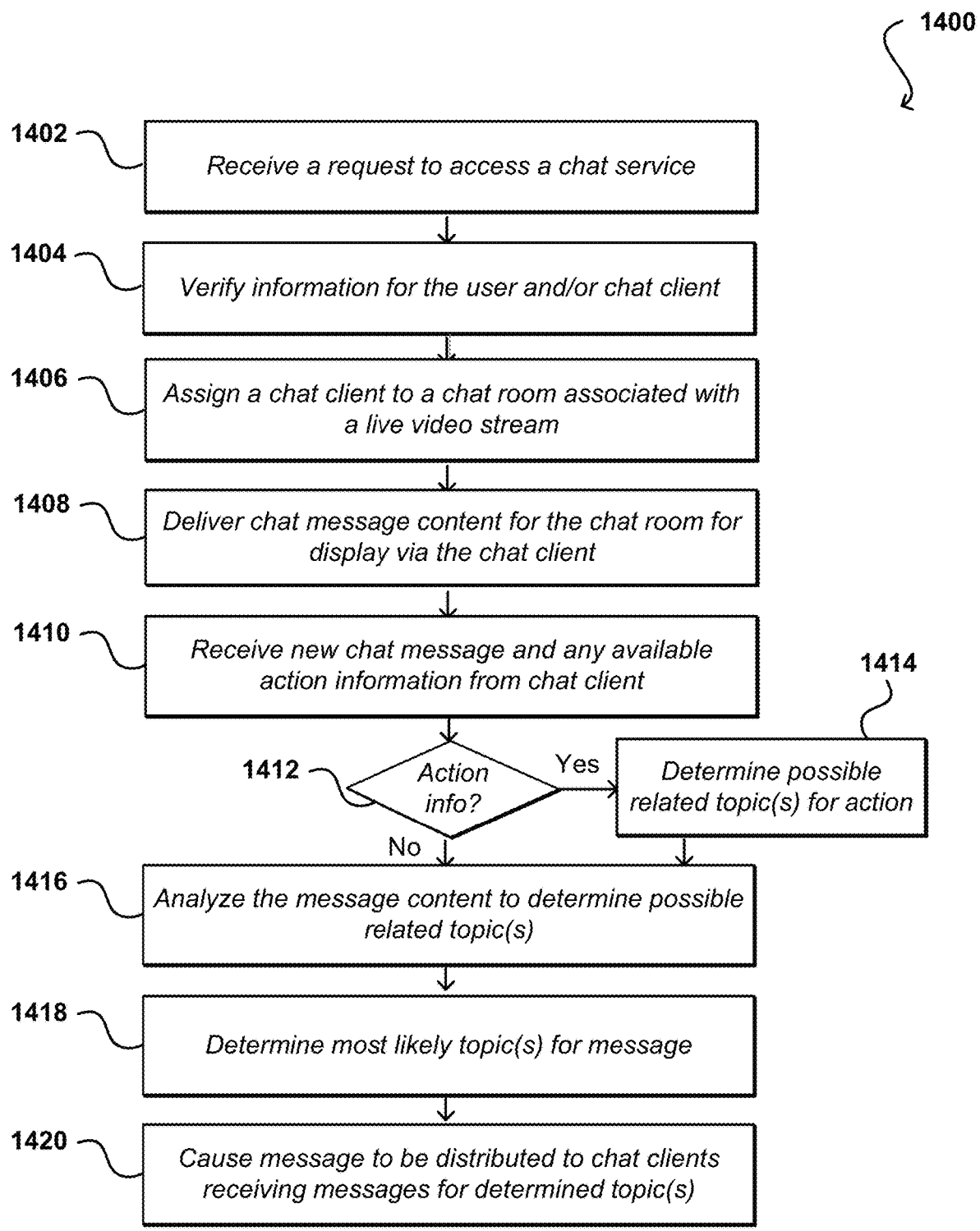
FIG. 14 illustrates an example process for determining the topic for a received chat message that can be utilized in accordance with various embodiments.

FIG. 14 illustrates an example process 1400 for filtering chat messages to be displayed on a computing device that can be utilized in accordance with various embodiments, and that can take advantage of the technology and approaches discussed above. It should be understood that, for any process discussed herein, there can be additional, fewer, or alternative steps performed in similar or alternative orders, or in parallel, within the scope of the various embodiments unless otherwise stated. In this example, a request to access a chat service is received 1402. In this example, the chat service is associated with a live video stream as discussed elsewhere herein. Information for a client device and/or user associated with the request can be verified 1404, and a chat client executing on the client device can be assigned 1406 to a chat room (or stream) associated with the video stream. As mentioned, in some embodiments the chat client can be assigned to a specific CDN as well. Once the chat client is assigned to a chat room, messages from the chat room can be delivered 1408 for display via the chat client. A chat message can subsequently be received 1410, along with any associated action data, from the chat client on the client device. A determination can be made 1412 as to whether any action data associated with the chat message was received from the chat client, or can be determined from the available information, as may relate to a gaze position of a user of the device or a last input to the chat client, among other such options. As mentioned elsewhere herein, determinations of gaze position can occur on the client device or through a server-side determination algorithm, among other such options. If action information is available, one or more possible related topics can be determined 1414 based at least in part upon the message. For example, if the gaze position of a user is determined to be on a particular character or item in the associated video stream, then a topic related to that character or item can be identified as a possible topic for the message. Additionally, the content of the message (i.e., the text of the message itself of any image or emoji contained with the message) can be analyzed 1416 to determine potential topics for the message as well. For example, if the message includes the name of a character or a type of item contained within the scene of the video stream, then that information can be used to determine potential topics for the message. It should be specifically pointed out that the receiving of chat content, determination of associated actions, and analysis of the chat content can occur in any particular order, or concurrently, in various embodiments.

Using information from the message content, the action data, and any other appropriate source(s), the most likely topic(s) for the message can be determined 1418. In some embodiments a confidence score will be generated for each potential topic based upon a calculated relevance between the topic and the message, as may be determined using any appropriate relevance algorithm known or used for such purposes. For example, a message containing the formal name of a character in the scene can have a very high confidence score of being related to a topic for that character, which a comment about boots may still be related to a pair of boots in the scene, but with a potentially lower confidence score since the specific boots are not mentioned and the gaze position does not indicate that the user is, or was recently, looking at the representation of the boots in the video stream. Any topic having a minimum confidence score above a threshold can be assigned as a topic of the message in some embodiments, while in others only the most likely topic is assigned, among other such options. If no confidence score exceeds a minimum threshold in some embodiments then no specific topic is assigned and the chat message is assigned to a "general" or other such category. The chat message can then be caused 1420 to be distributed to chat clients that are currently receiving messages for that topic, which can be determined as discussed elsewhere herein. In some embodiments the chat client sending the message will always display a chat message initiated by that chat client. In some embodiments the selection of messages will occur before the messages are sent to the client device, while in other embodiments all messages will be sent to the client device along with filtering criteria, which the client device can then use to determine which messages to display, as discussed in more detail elsewhere herein.

Figure 15:
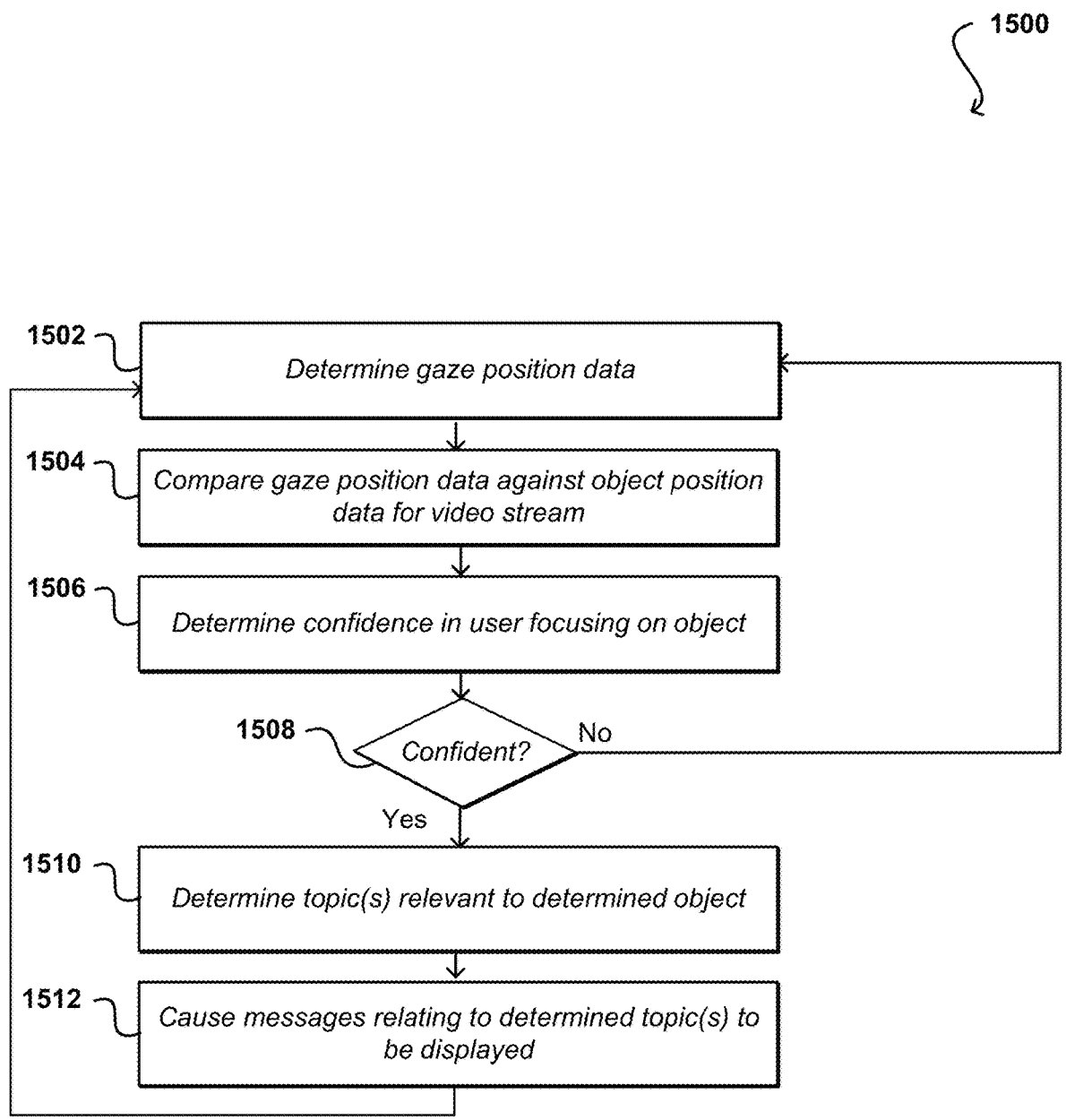
FIG. 15 illustrates an example process for determining which chat messages to provide to a chat client that can be utilized in accordance with various embodiments.

FIG. 15 illustrates an example process 1500 for filtering chat messages based on determined action that can be utilized in accordance with various embodiments. In this example, gaze position data is determined 1502 for a computing device associated with a user and executing a chat client. As mentioned, however, various other types of action data can be received as well within the scope of the various embodiments. In this example, the gaze position data is compared 1504 against object position data for the corresponding video stream (or other displayed content for his position data is available), such as by comparing pixel location for the gaze position data to pixel regions associated with various objects displayed in the video stream. Accordingly, the gaze position data received may include screen display coordinates, zoom level coordinates, or other such information that can enable the gaze position coordinates to be correlated to the object coordinates of the video stream. Along with the position, other factors can be considered as well, such as whether the gaze position has corresponded to the identified object for at least a minimum period of time, referred to elsewhere herein as a "dwell" period of time. The dwell period in at least some embodiments can be determined by analyzing time stamp data associated with the available action data. As mentioned, users will often look at various objects in a scene, but such viewing may not necessarily imply interest. Computer learning and other such approaches can be used to determine the amount of time that a user spends viewing an object of interest versus a random object in a scene. Further, different dwell times might be applicable for different types of objects, actions, or content streams, among other such options. In at least some embodiments the available data can be analyzed to determine 1506 a respective confidence score for one or more objects represented in the display or otherwise associated with the client device. At least the highest confidence score can then be compared against a confidence threshold, for example, to determine whether it can be determined that the user is focusing on the representation of the associated object with sufficient confidence. As described elsewhere herein, an object of focus can be any object represented in the primary content (or elsewhere) that is determined to be focused on by the user at a point in time, such as may be indicated by the user gazing at a representation of the object for at least a dwell period, discussing the object, interacting with the representation of the object, etc. If not, messages for topics currently associated with the chat client can continue to be sent, even if the topic is a general topic and no specific topics have been identified for that chat client. In other embodiments, messages relating to the two or three highest confidence objects can be displayed, among other such options. If no action information (i.e., gaze position data) is available, various other message filtering approaches can be used as discussed and suggested elsewhere herein.

If an object is identified whose representation in the video stream is determined 1508 to correspond to the gaze position with sufficient confidence one or more topics related to the determined object of interest can be determined 1510. As mentioned, in some instances the topics will be predefined and available through metadata or other data associated with the video stream, while in other embodiments information about the object can be used to determine one or more relevant topics, among other such options. Once one or more topics relating to the item are determined, messages relating to that topic can be caused 151 to be displayed via the respective chat client for display. As mentioned, depending on the volume of messages for the identified topic(s) one or more additional filters or selection criteria can be used as well within the scope of the various embodiments. Further, the messages can be filtered before sending to the client device or filtered on the client device using provided filtering criteria corresponding to the determined topic(s), among other such actions.

Figure 16:
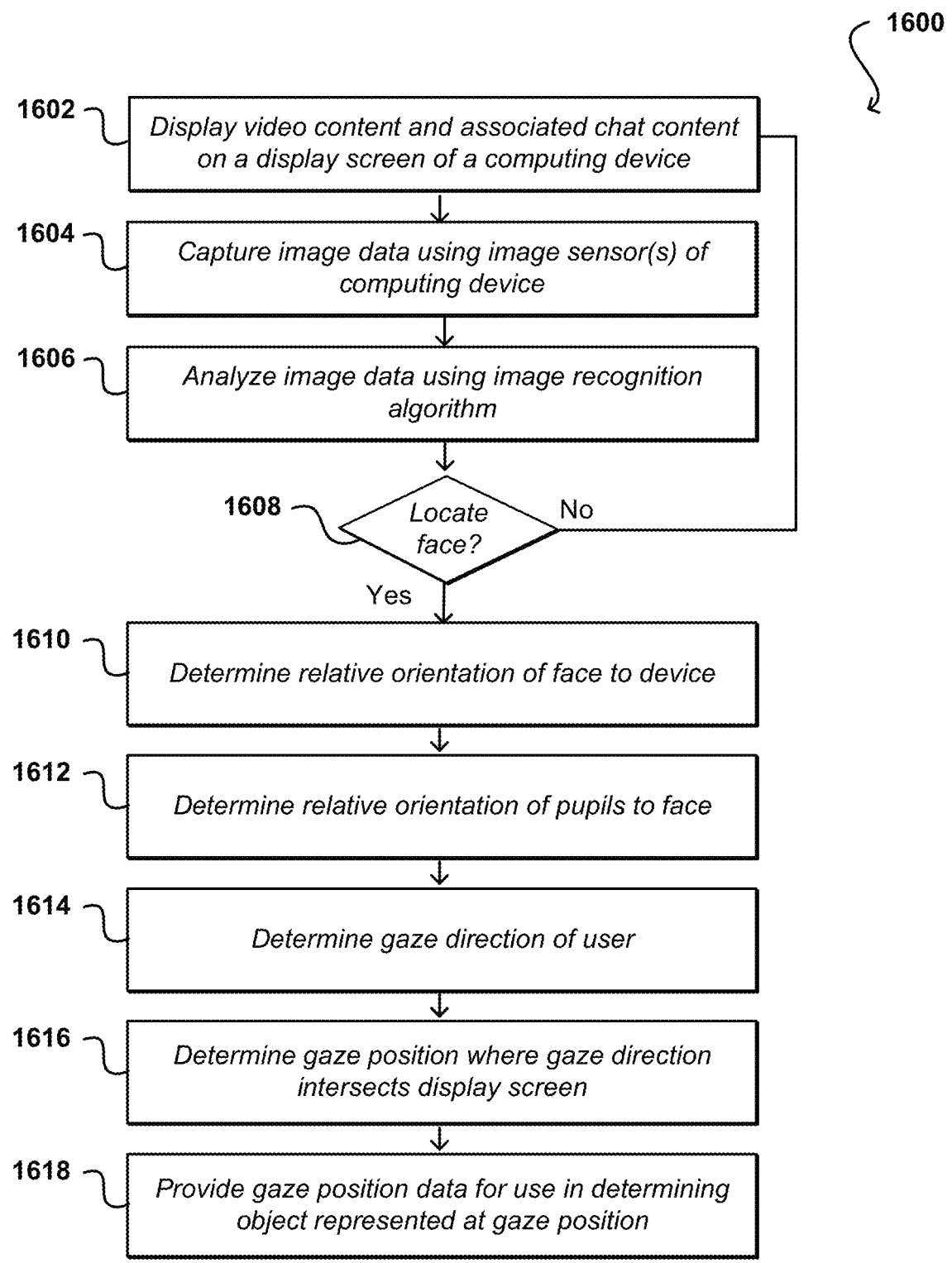
FIG. 16 illustrates an example process for determining the gaze position for a computing device that can be utilized in accordance with various embodiments.

In order to provide the gaze position data, the client device executing the chat client can at least collect information useful in determining the current gaze position. Accordingly, FIG. 16 illustrates an example process 1600 for determining gaze position data that can be utilized in accordance with various embodiments. In this example, video content and associated chat content are displayed 1602 on a display screen of a computing device. As mentioned, these can be displayed as separate windows or portions of a page viewed through a Web browser, or can be displayed through separate but related applications executing on the computing device, among other such options. Image data can be captured 1604, concurrent with the displaying, using one or more image sensors (i.e., still or video camera, proximity sensors, or infrared sensors) positioned on the device such that a user viewing the content would likely be contained within a viewing angle of the sensor(s). The image data can be analyzed 1606, on the computing device and/or remotely, to attempt to identify or recognize a face represented in the image data. This can be performed using any of a number of algorithms or processes, such as a facial detection or image analysis algorithm, as discussed elsewhere herein. In some embodiments a face detection algorithm might be used to attempt to verify an identity of the viewer as well, as content filtering might only be performed for authorized user(s) of the device. If a representation of a face cannot be located in the image data, the process can continue.

If a representation of a face can be located in the image data, image data corresponding to the face (as well as potentially other information identified herein) can be used to attempt to determine 1610 the relative orientation of the face to the device. This can include, for example, determining orientation angle and distance. The relative orientation of the pupils to the face can also be determined 1612 using the image and/or other data. Based on the relative orientations of the face and pupils, for example, a gaze direction of the user can be determined 1614 with respect to the device. As mentioned, the gaze direction can be a three-dimensional vector in free space. The gaze direction can be analyzed, from the relative direction and/or position of the user, to determine 1616 a gaze position where the gaze direction intersects the display screen (or other appropriate portion of the computing device). As mentioned, this can include a pixel location, coordinate, defined zone, or other such position. The gaze position data can then be provided 1618 for use in determining an object corresponding to that gaze position, such as an object having at least a portion of a representation displayed at that gaze position. As mentioned, the object can be used to determine one or more topics of interest for the purposes of selecting and/or filtering chat content and/or other social media sourced content on the computing device.

Figure 17:
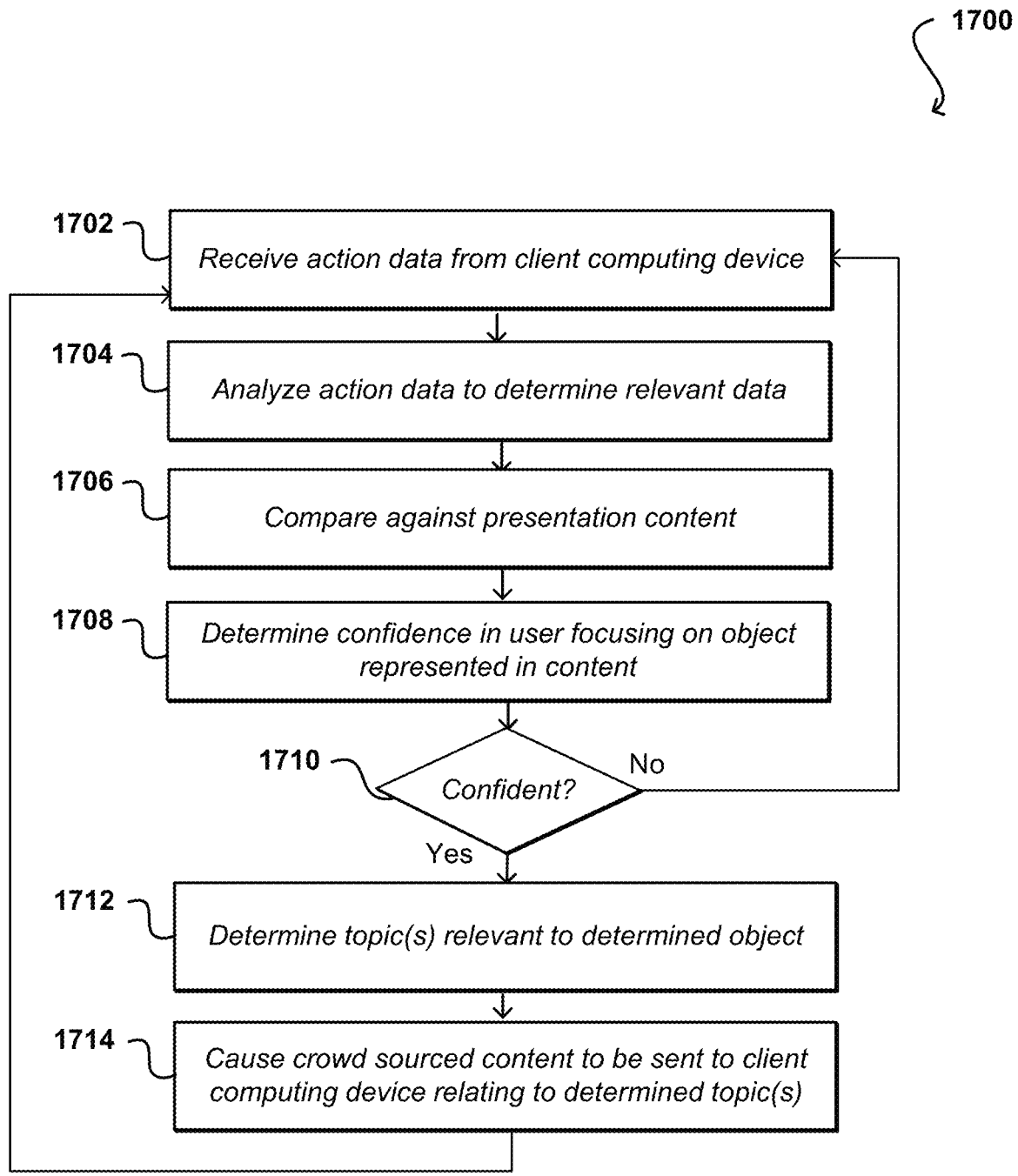
FIG. 17 illustrates an example process for determining which supplemental content to provide to a computing device based upon determined actions that can be utilized in accordance with various embodiments.

FIG. 17 illustrates an example process 1700 for selecting and/or filtering supplemental content, such as crowd-sourced or social media-based content, based on various determined actions that can be utilized in accordance with various embodiments. In this example, action data is determined 1702 for a computing device associated with a user. As mentioned, the action data can include information such as image data, speech data, user input data, gaze position data, and the like. The action data, or at least a portion thereof, can be analyzed 1704 to attempt to determine relevant data. This can include, for example, determining gaze position, brand names in speech data, selections with respect to specific objects, and the like, which can occur on the client device or by using a server-side analysis algorithm in the provider environment, among other such options. In this example, the action data is compared 1706 against the primary or presentation content, or data associated with that content, being presented on the computing device. This can include, for example, analyzing position data, object names, and other such information available for a relevant portion of the content being presented. The confidence that a user is focusing on an object represented in the presentation content (or otherwise) can be determined 1708 using various approaches discussed and suggested herein, as may include the gaze position corresponding to an object for at least a minimum dwell time, voice data discussing the object being detected, a selection input corresponding to the object, etc. A determination can be made 1710 as to an object focus can be determined with sufficient confidence, such as a highest confidence value that exceeds a confidence threshold. If not, supplemental content for topics currently associated with the computing device can continue to be sent, even if the topic is a general topic and no specific topics have been identified. If no action data is available, various other filtering or selection approaches can be used as discussed and suggested elsewhere herein.

If an object is identified that corresponds to the action data with sufficient confidence, one or more topics related to the determined object of interest can be determined 1712. As mentioned, in some instances the topics will be predefined and available through metadata or other data associated with the presentation content, while in other embodiments information about the object can be used to determine one or more relevant topics, among other such options. Once one or more topics relating to the object are determined, supplemental content relating to that topic can be caused 1714 to be selected for presentation on the respective computing device. As mentioned, depending on the volume of supplemental content for the identified topic(s) one or more additional filters or selection criteria can be used as well within the scope of the various embodiments. For example, input parameters that can influence a decision as to how many messages to show or hide can include the count of messages over a unit of time, as well as the length of messages over a unit of time. It thus can be desirable to display the right amount of text such that the customer can read the text while also paying attention to the video or other presentation content. The filtering can also occur on the client device or in the provider environment, among other such options.

As mentioned elsewhere herein, the objects can be identified in presentation content, such as a video stream, in a number of different ways. For example, a provider of the content might analyze the content before it is broadcast or provided for streaming, and incorporate the identification and position data as metadata or additionally available data for the stream. In other embodiments identifying information for various products represented in the video can be provided, and image recognition software can be used to determine the presence and location of those objects as displayed. In still other embodiments, object recognition algorithms or other such processes can be used to analyze the video stream in near real time and provide location data for objects that are represented and recognized in the video stream. In some embodiments the algorithms can be used to identify various color, textures, and patterns as well, which can help with the identifying of objects and/or determination of filtering topics. In some embodiments content can be tagged with information that identifies objects in a scene, where those tags can be added by entities such as providers, producers, viewers, and the like. Various other processes can be used as well as discussed and suggested elsewhere herein.

Further, the "position" of an object in the presentation content can be represented in a number of different ways. For example, an object position can be defined by a single point, such as a coordinate for a centroid or corner position, or can be defined by a region, outline, or bounding box set of pixel or screen coordinates, among other such options. A gaze position can be determined to correspond to such a representation if the gaze position corresponds to one of these pixel locations, is within a threshold distance or pixel number from one of these locations, or is closest to the pixels for this particular object, among other such options.

In some embodiments, the "real-time" filtering in response to determined user action can be performed specifically for each user or client device. In other embodiments, there may be a limited number of topics for the primary or presentation content at any time, such that a determined number of chat or supplemental content streams can be generated, and the client device can be assigned to one of those streams based on user action. When an action is determined that corresponds to a different object, the client device can be assigned a different message stream. Generating specific streams for specific client devices, however, enables other user-specific filters to be utilized as discussed elsewhere herein. In some embodiments, a process evaluates each received chat message or other instance of supplemental content in order to determine whether that message should be provided to a particular computing device.

In some embodiments text for the supplemental content can scroll on the screen such that when a new message or instance is received, that message can appear at the bottom (or top) of the relevant window. Previous messages can be displayed above the newest message in reverse chronological order, with recent messages towards the bottom and older messages towards the top. In conventional applications new messages pop into view as they are received, meaning there is no visual transition. As an example, at time 0 messages a, b, c are displayed, and at time 1 messages b, c, and d are displayed. The customer must notice that the content changed. Approaches in accordance with various embodiments can attempt to improve the readability when new messages arrive by scrolling text smoothly on screen. Instead of updating the view with all messages pushed up by one row, for example, the scrolling of the messages can be animated to smoothly transition by shifting the messages up pixel by pixel until they are at the desired location. The scroll speed can be set based on the speed and length of incoming messages, among other such factors.

As mentioned, the volume of messages displayed can depend at least in part upon the actions of the user. The gaze position data can be used to determine whether a user is paying attention to the video or chat. A determination as to whether the user is paying attention to the video, the chat, or other content can be an input to a message filtering or selection process. Being able to determine the content and the focus enables decisions to be made, such as ignoring messages if the customer is focused on the video and the chat discussion relates to a prior segment. Alternatively, the messages might all be displayed so the customer can eventually catch up on the discussion. Similarly, if the customer is focused on the chat from one scene or segment of the video, do not show messages (or show fewer messages) from other segments of the video. Movement of the gaze position can also be used as an input to the filter. For example, if the user's gaze returns to a particular object, that can be more indicative of that object being of interest to the user. If the customer is gazing at the chat window and the focus drifts upward as new messages arrive (meaning the customer is reading an old message), the filter can be influenced to prevent new messages from appearing on screen. When the gaze moves to other messages, the filter can begin showing more messages. In systems where the text scrolls automatically at a rate that the customer reads, this speed can be an input to the filter. Given a target reading speed, the filtering process can determine to show enough messages to match that speed, whether by the count of messages or the length of messages.

As mentioned, message filtering can happen on the server side or on the client side, or some combination thereof. An advantage to client side filtering is that sending thousands of messages to every customer can waste a lot of bandwidth if only around one percent of those messages will eventually be displayed. A potential drawback to such an approach, however, is that the process can be slow in order to analyze and select which messages to provide to each customer and then provide them. For that reason, it might make sense in at least some embodiments to send all the data to the customer device and then determine which messages to show or filter on the client device.

It should also be mentioned again that although gaze direction is used as a primary example for determined actions useful for determining filtering, there can be various other types of actions utilized as well. As discussed, audio capture and recognition can be used to determine objects that a user is discussing, which can be used to determine an appropriate topic. Similarly, if there is a related text window open that is accessible, content or terms entered in that window can be analyzed as well. If a user uses a finger or mouse pointer to select or interact with a specific displayed object or element, for example, that interaction can be used as input as well. This can include, for example, a user using his or her fingers to zoom the screen to get a better view of a particular object of interest.

Figure 18:
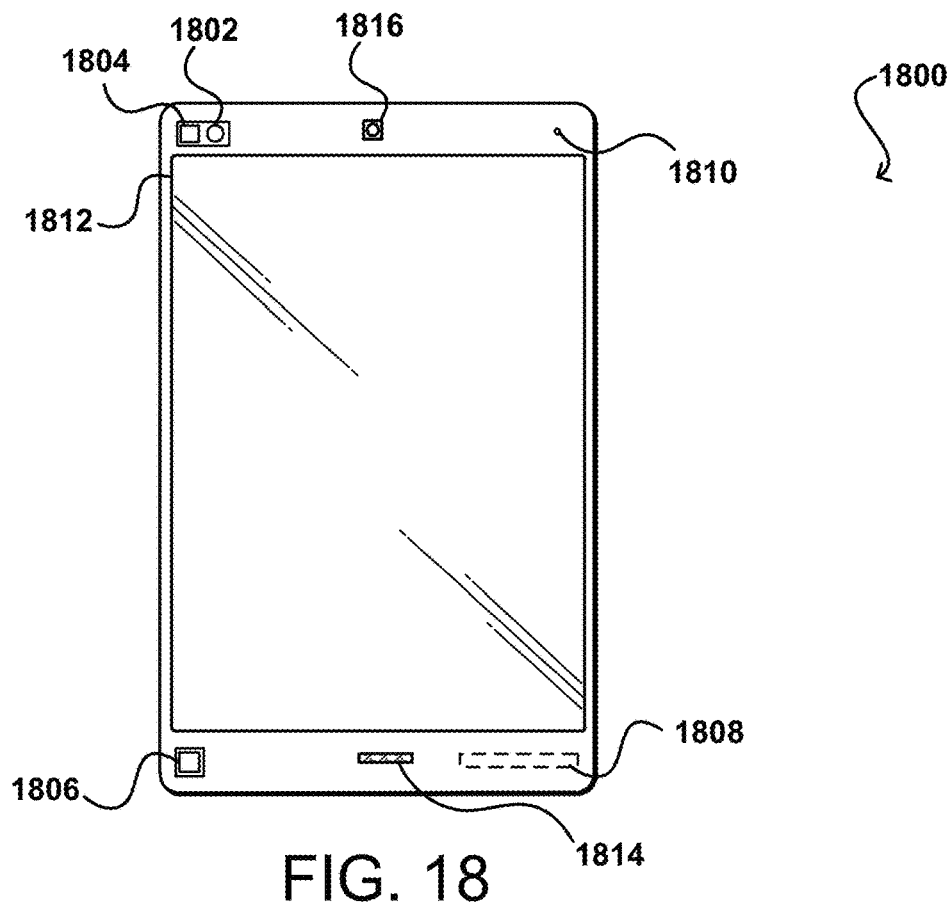
FIG. 18 illustrates an example of a computing device that can be used in accordance with various embodiments.

FIG. 18 illustrates an example electronic computing device 1800 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 1800 has a display screen 1802 (e.g., an LCD element) operable to display information or image content to one or more users or viewers of the device. The display screen of some embodiments displays information to the viewers facing the display screen (e.g., on the same side of the computing device as the display screen). The computing device in this example can include an imaging element 1804 on the front of the device. It should be understood, however, that image capture elements could also, or alternatively, be placed on the sides or corners of the device, and that there can be any appropriate number of capture elements of similar or different types. The imaging element 1804 may be, for example, a camera, a charge-coupled device (CCD), a motion detection sensor or an infrared sensor, or other image capturing technology.

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there microphone 1806 is on the front side of the device. In some devices there may be only one microphone, while in other devices there might be at least one microphone on each side and/or corner of the device, or in other appropriate locations.

The device 1800 in this example also includes one or more orientation- or position-determining elements operable to provide information such as a position, direction, motion, or orientation of the device. These elements can include, for example, accelerometers, inertial sensors, electronic gyroscopes, and electronic compasses.

The example device also includes at least one communication mechanism 1808, such as may include at least one wired or wireless component operable to communicate with one or more electronic devices. The device also includes a power system, such as may include a battery operable to be recharged through conventional plug-in approaches, or through other approaches such as capacitive charging through proximity with a power mat or other such device. Various other elements and/or combinations are possible as well within the scope of various embodiments.

Figure 19:
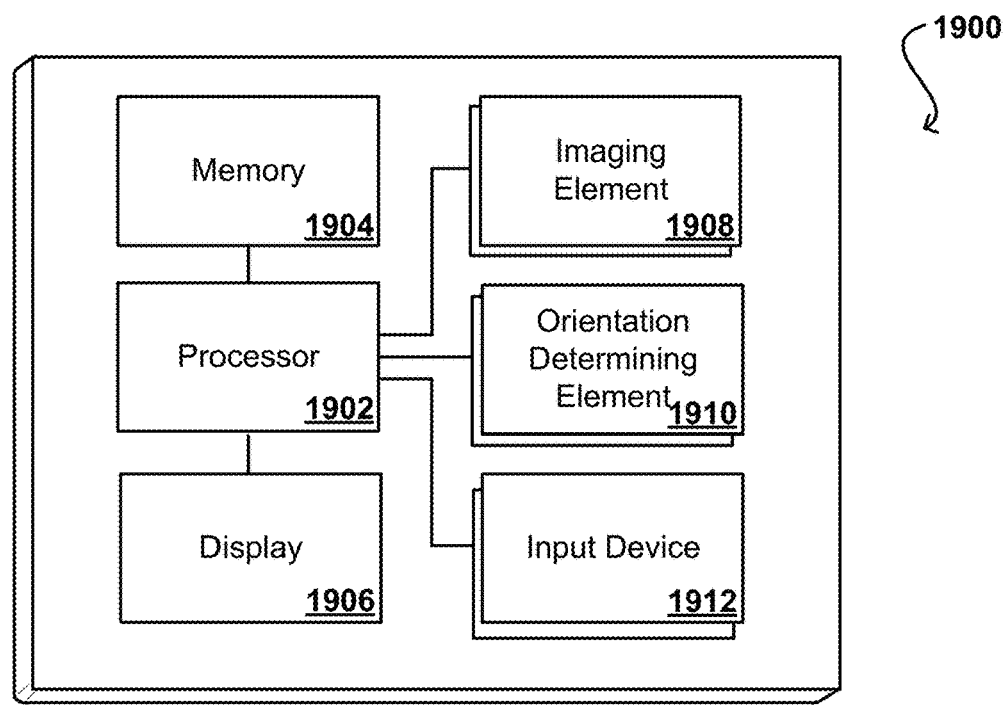
FIG. 19 illustrates an example configuration of components of a computing device such as that illustrated in FIG. 18.

FIG. 19 illustrates a set of basic components of an electronic computing device 1900 such as the device 1800 described with respect to FIG. 18. In this example, the device includes at least one processing unit 1902 for executing instructions that can be stored in a memory device or element 1904. As would be apparent to one of ordinary skill in the art, the device can include many types of memory, data storage, or computer-readable media, such as a first data storage for program instructions for execution by the processing unit(s) 1902, the same or separate storage can be used for images or data, a removable memory can be available for sharing information with other devices, and any number of communication approaches can be available for sharing with other devices.

The device typically will include some type of display screen 1906, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1908, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command/instruction from a user, application, or other device.

The example computing device 1900 also includes at least one orientation determining element able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1900. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element for determining a location of the device (or the user of the device). A positioning element can include or comprise a GPS or similar location-determining elements operable to determine relative coordinates for a position of the device. Positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

The example device also includes one or more networking components 1910 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 812 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

The various embodiments can be implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java, C, C # or C++ or any scripting language, such as Perl, Python or TCL, as well as combinations thereof. The server(s) may also include database servers, including without limitation those commercially available from Oracle, Microsoft, Sybase and IBM.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display screen or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, sending and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other computer readable media for containing code, or portions of code, can include any appropriate non-transitory media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
sending, for display on a first client device, video data representing live coverage of an event in a camera's field of view;
sending chat data associated with the video data, the chat data representing textual information received from a second client device;
receiving, from the first client device, first gaze position data representing a first area of a first display screen of the first client device, the first area representing a first gaze direction of a first user at a first time;
receiving first timestamp data associated with the first time;
determining an object of interest represented in a portion of the video data that is associated with the first area and the first timestamp data;
receiving future chat data after the first time, the future chat data including a first subset of future chat data received from the second client device;
receiving, from the second client device, second gaze position data representing a second area of a second display screen of the second client device, the second area representing a second gaze direction of a second user at a second time;
receiving second timestamp data associated with the second time;
determining that the object of interest is associated with the second area and the second timestamp data;
determining that the first subset of the future chat data represents a first chat message associated with the object of interest based at least upon the first chat message being associated with the second client device and the second time;
sending the first subset of future chat data to the first client device;

determining that a second subset of the future chat data represents a second chat message unrelated to the object of interest; and
determining not to send the second subset of future chat data to the first client device.

2. The computer-implemented method of claim 1, further comprising:
receiving subsequent gaze position data representing a second area of the first display screen of the first client device, the second area representing a second gaze direction of the first user at a second time;
determining a second object of interest represented in the portion of the video data that is associated with the second area of the first display screen and the second timestamp data;
determining that a third subset of the future chat data represents a third chat message associated with the second object of interest;
sending the third subset of future chat data to the first client device;
determining that a fourth subset of the future chat data represents a fourth chat message unrelated to the second object of interest; and
determining not to send the fourth subset of future chat data to the first client device.

3. The computer-implemented method of claim 1, further comprising:
receiving a third chat message from the first client device;
receiving an associated timestamp for the third chat message;
determining an object of interest at a time of the associated timestamp;
assigning a related topic to the third chat message, the related topic corresponding to the object of interest; and
transmitting the third chat message to other client devices receiving messages associated with the related topic.

4. The computer-implemented method of claim 1, further comprising:
determining that the first gaze position data indicates the first area of the first display screen for at least a minimum period of time before determining the object of interest.

5. A computer-implemented method, comprising:
sending primary content data representing first primary content to a first client device;
receiving first supplemental content data, the first supplemental content data representing first supplemental content including at least one of text or audio related to at least one topic of the first primary content;
sending the first supplemental content data to the first client device;
receiving, from the first client device, first action data indicating an object of focus for the first client device at a specific time;
determining that the at least one topic is associated with the object of focus;
determining that second action data, associated with the first primary content and received as textual data from a second client device, is associated with the at least one topic;
obtaining a first subset of data associated with message data included in second supplemental content;
determining that the first subset of data relates to the topic, based at least in part upon the determination that the second action data is associated with the topic, and based further upon the first subset of data being associated with the second client device;
causing the first subset of data to be displayed on the first client device;
determining a number of messages included in the second supplemental content exceeds a threshold number of messages over a period of time; and
preventing, based at least in part on the determination that the number of messages exceeds the threshold number of messages, a second subset of data associated with the second supplemental content from being displayed on the first client device.

6. The computer-implemented method of claim 5, further comprising:
sending, to the first client device, at least one of the first subset of data, or data for the topic enabling the first client device to determine the first subset of data.

7. The computer-implemented method of claim 5, wherein the first supplemental content includes a first plurality of chat messages, and further comprising:
receiving the first plurality of chat messages;
receiving associated timestamp data for a first chat message of the first plurality of chat messages;
analyzing the first chat message to determine an object of focus at a time associated with the timestamp data; and
associating a respective topic with the first chat message, the respective topic being associated with the object of focus.

8. The computer-implemented method of claim 7, further comprising:
determining at least one attribute for a selected chat message of the first plurality of chat messages; and
causing a third subset of data associated with the second supplemental content to be filtered out based at least in part upon the at least one attribute, the third subset of data associated with the object of focus.

9. The computer-implemented method of claim 7, further comprising:
analyzing, using natural language processing, a respective content of a determined chat message of the first plurality of chat messages; and
selecting the determined chat message to be included in the first subset of data associated with the second supplemental content based at least in part upon the respective content.

10. The computer-implemented method of claim 5, wherein the first primary content is video content corresponding to a video stream, and further comprising:
determining, from the first action data, gaze position data corresponding to the first client device at a specific time, the gaze position data representing an area of a display screen of the first client device, the area representing a gaze direction of a user at a specific time;
receiving timestamp data associated with the specific time;
determining an object of interest represented in a portion of the video data that is associated with the area and the timestamp data; and
determining the topic based at least in part upon the object of interest.

11. The computer-implemented method of claim 10, wherein the first action data includes image data and reference coordinate data, and further comprising:
analyzing the image data to identify a representation of a face of the user in the image data; and
determining the gaze direction of the user based at least in part upon a relative orientation of the representation of the face identified in the image data.

12. The computer-implemented method of claim 5, further comprising:
   determining a confidence score for the first action data; and
   determining that the confidence score at least satisfies a confidence threshold before obtaining the first subset of data associated with the second supplemental content.

13. The computer-implemented method of claim 5, further comprising:
   determining the first subset of data associated with the second supplemental content further based at least in part upon information specific to the first client device or a user associated with the first client device.

14. A system, comprising:
   at least one processor; and
   memory including instructions that, when executed by the at least one processor, cause the system to:
      send primary content data representing first primary content to a first client device;
      receive first supplemental content data, the first supplemental content data representing first supplemental content including at least one of text or audio related to at least one topic of the first primary content;
      send the first supplemental content data to the first client device;
      receive, from the first client device, first action data indicating an object of focus for the first client device at a specific time;
      determine that the at least one topic is associated with the object of focus;
      determine that second action data, associated with the first primary content and received as textual data from a second client device, is associated with the topic;
      obtain a first subset of data associated with message data included in second supplemental content;
      determine that the first subset of data relates to the topic based at least in part upon the determination that the second action data is associated with the topic, and based further upon the first subset of data being associated with the second client device;
      cause the first subset of data to be displayed on the first client device;
      determine a number of messages included in the second supplemental content exceeds a threshold number of messages over a period of time; and
      prevent, based at least in part on the determination that the number of messages exceeds the threshold number of messages, a second subset of data associated with the second supplemental content from being displayed on the first client device.

15. The system of claim 14, wherein the instructions when executed further cause the system to:
   send, to the first client device, at least one of the first subset of data, or data for the topic enabling the first client device to determine the first subset of data.

16. The system of claim 14, wherein the first supplemental content includes a first plurality of chat messages, and wherein the instructions when executed further cause the system to:
   receive the first plurality of chat messages;
   receive associated timestamp data for a first chat message of the first plurality of chat messages;
   analyze the first chat message to determine an object of focus at a time associated with the timestamp data; and
   associate a respective topic with the first chat message, the respective topic being associated with the object of focus.

17. The system of claim 14, wherein the instructions when executed further cause the system to:
   determine at least one attribute for a selected chat message of the first plurality of chat messages; and
   cause a third subset of data associated with the second supplemental content to be filtered out based at least in part upon the at least one attribute, the third subset of data associated with the object of focus.

18. The system of claim 14, wherein the instructions when executed further cause the system to:
   analyze, using natural language processing, a respective content of a determined chat message of the first plurality of chat messages; and
   select the determined chat message to be included in the first subset of data associated with the second supplemental content based at least in part upon the respective content.

19. The system of claim 14, wherein the instructions when executed further cause the system to:
   determine, from the first action data, gaze position data corresponding to the first client device, at a specific time, the gaze position data representing an area of a display screen of the first client device, the area representing a gaze direction of a user at a specific time;
   receive timestamp data associated with the specific time;
   determine an object of interest represented in a portion of the primary content data that is associated with the area and the timestamp data; and
   determine the topic based at least in part upon the object of interest.

20. The system of claim 19, wherein the first action data includes image data and reference coordinate data, and wherein the instructions when executed further cause the system to:
   analyze the image data to identify a representation of a face of the user in the image data; and
   determine the gaze direction of the user based at least in part upon a relative orientation of the representation of the face identified in the image data.

* * * * *